(12) United States Patent
Kamiya et al.

(10) Patent No.: US 11,358,884 B2
(45) Date of Patent: Jun. 14, 2022

(54) WATER TREATMENT APPARATUS AND WATER TREATMENT METHOD

(71) Applicant: Mitsubishi Electric Corporation, Chiyoda-ku (JP)

(72) Inventors: Yu Kamiya, Chiyoda-ku (JP); Gaku Oinuma, Chiyoda-ku (JP); Teruki Naito, Chiyoda-ku (JP); Yasutaka Inanaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 78 days.

(21) Appl. No.: 16/967,458

(22) PCT Filed: Mar. 22, 2018

(86) PCT No.: PCT/JP2018/011332
§ 371 (c)(1),
(2) Date: Aug. 5, 2020

(87) PCT Pub. No.: WO2019/180864
PCT Pub. Date: Sep. 26, 2019

(65) Prior Publication Data
US 2020/0392024 A1 Dec. 17, 2020

(51) Int. Cl.
*C02F 1/48* (2006.01)
*C02F 1/64* (2006.01)
(Continued)

(52) U.S. Cl.
CPC .............. *C02F 1/48* (2013.01); *C02F 1/64* (2013.01); *C02F 1/78* (2013.01);
(Continued)

(58) Field of Classification Search
CPC ...... C02F 1/72; C02F 1/32; C02F 1/48; C02F 1/64
See application file for complete search history.

(56) References Cited

U.S. PATENT DOCUMENTS

| 9,868,655 B1* | 1/2018 | Oinuma .................... C02F 1/44 |
| 2004/0084382 A1 | 5/2004 | Ryazanova et al. |
| 2017/0362107 A1 | 12/2017 | Oinuma et al. |

FOREIGN PATENT DOCUMENTS

| JP | 50-133650 A | 10/1975 |
| JP | 1-275402 A | 11/1989 |

(Continued)

OTHER PUBLICATIONS

International Search Report dated May 22, 2018 in PCT/JP2018/011332 filed Mar. 22, 2018, 2 pages.
(Continued)

*Primary Examiner* — Walter D. Griffin
*Assistant Examiner* — Cameron J Allen
(74) *Attorney, Agent, or Firm* — Xsensus LLP

(57) ABSTRACT

A water treatment apparatus includes: a treatment tank, having therein a grounded electrode and a high-voltage electrode opposing the grounded electrode, for generating electric discharge between both the electrodes, and causing to-be-treated water to pass between the electrodes and contact with the electric discharge to perform water treatment, an ozone mixing portion for supplying ozone-containing gas in the treatment tank through a gas sending portion to the to-be-treated water supplied from outside, and a gas returning portion for sending gas in the ozone mixing portion to the treatment tank, are provided, and water treatment is performed by ozone in the ozone mixing portion, and water treatment is thereafter performed by the electric discharge in the treatment tank.

11 Claims, 7 Drawing Sheets

(51) Int. Cl.
  *C02F 1/78* (2006.01)
  *C02F 101/20* (2006.01)
  *C02F 101/36* (2006.01)

(52) U.S. Cl.
  CPC .. *C02F 2101/203* (2013.01); *C02F 2101/206* (2013.01); *C02F 2101/366* (2013.01); *C02F 2201/48* (2013.01); *C02F 2201/78* (2013.01); *C02F 2305/023* (2013.01)

(56) References Cited

FOREIGN PATENT DOCUMENTS

| JP | 2000-185289 A | 7/2000 |
| JP | 2001-986 A | 1/2001 |
| WO | WO 2016/117259 A1 | 7/2016 |

OTHER PUBLICATIONS

Office Action dated Feb. 7, 2022 in Chinese Patent Application No. 201880091239.0, 20 pages.

\* cited by examiner

WATER TREATMENT APPARATUS AND WATER TREATMENT METHOD

TECHNICAL FIELD

The present disclosure relates to a water treatment apparatus and a water treatment method for purifying to-be-treated water by using electric discharge.

BACKGROUND ART

Industrial waste water and the like may contain persistent substances typified by dioxins and dioxin-like compounds and dioxane. In order to decompose the persistent substances, an electric-discharge water treatment in which to-be-treated water is subjected to electric discharge, and OH radicals and the like generated by the electric discharge are caused to react with to-be-treated water, is suggested.

For the electric-discharge water treatment, the applicant suggests a water treatment apparatus in which a plurality of electric discharge units, each including a flat-plate like grounded electrode and a wire-like high-voltage electrode opposing each other in the up-down direction, generate electric discharge toward the water surface that moves downward on the grounded electrode so as to flow like a film, a plurality of water storage portions store to-be-treated water and supply ozone, and the plurality of electric discharge units and the plurality of water storage portions are alternately disposed in a housing, and ozone and hydrogen peroxide generated by the electric discharge are caused to be dissolved into the to-be-treated water, to perform treatment of the to-be-treated water (see Patent Document 1).

CITATION LIST

Patent Document

Patent Document 1: International Publication No. WO2016/117259

SUMMARY OF THE INVENTION

Problems to be Solved by the Invention

In the water treatment apparatus using electric discharge, ozone is subsidiarily generated by the water treatment. The generated ozone is dissolved into the to-be-treated water, to contribute to reaction in the water treatment. An amount of ozone generated by the electric discharge is greater than an amount of ozone consumed in the water treatment, and decomposition of ozone and generation of ozone simultaneously occur by the electric discharge. Therefore, an amount of ozone which is decomposed or discharged to the outside of the apparatus without contributing to the water treatment is great, and enhancement of an ozone utilization rate is expected for enhancing efficiency of the water treatment.

The present disclosure discloses a technique for solving the aforementioned problem, and an object of the present disclosure is to provide a water treatment apparatus and a water treatment method in which the water treatment apparatus that decomposes organic substances in to-be-treated water by bringing electric discharge and the to-be-treated water into contact with each other is allowed to enhance an ozone utilization rate and efficiently decompose the organic substances with a simple apparatus structure.

Solution to the Problems

A water treatment apparatus according the present disclosure includes: an ozone mixing portion formed as a sealed container in which ozone-containing gas is supplied to to-be-treated water; a treatment tank formed as a sealed container separate from the ozone mixing portion, the treatment tank including an electric discharge unit having a grounded electrode and a high-voltage electrode opposing the grounded electrode, the treatment tank generating electric discharge by the electric discharge unit, generating ozone by the electric discharge, and bringing the to-be-treated water into contact with the electric discharge; a gas sending portion for connecting between the ozone mixing portion and the treatment tank and supplying ozone-containing gas in the treatment tank, to the to-be-treated water in the ozone mixing portion; a to-be-treated water inlet portion for connecting between the ozone mixing portion and the treatment tank and supplying the to-be-treated water from the ozone mixing portion to the treatment tank; and a gas returning portion for connecting between the ozone mixing portion and the treatment tank and sending gas in the ozone mixing portion to the treatment tank.

Furthermore, a water treatment method according to the present disclosure includes: a first water treatment step of supplying gas containing ozone, to to-be-treated water stored in a first sealed container; and a second water treatment step of bringing the to-be-treated water having been subjected to the first water treatment step, gas after the first water treatment step, and supplied oxygen into contact with electric discharge, in a second sealed container; and a step of sending gas, containing ozone, generated by the electric discharge in the second sealed container, to the first sealed container, and adjusting a flow rate of circulating gas that circulates in the first and the second sealed containers, and, in the water treatment method, the ozone generated by the electric discharge in the second water treatment step is used in the first water treatment step.

Effect of the Invention

In the above-described structure, before to-be-treated water is treated by electric discharge, water treatment is performed with the use of ozone generated by the electric discharge. Therefore, the water treatment apparatus and the water treatment method that enhance an ozone utilization rate and can efficiently decompose organic substances with a simple apparatus structure, can be provided.

DESCRIPTION OF EMBODIMENTS

Figure 1:
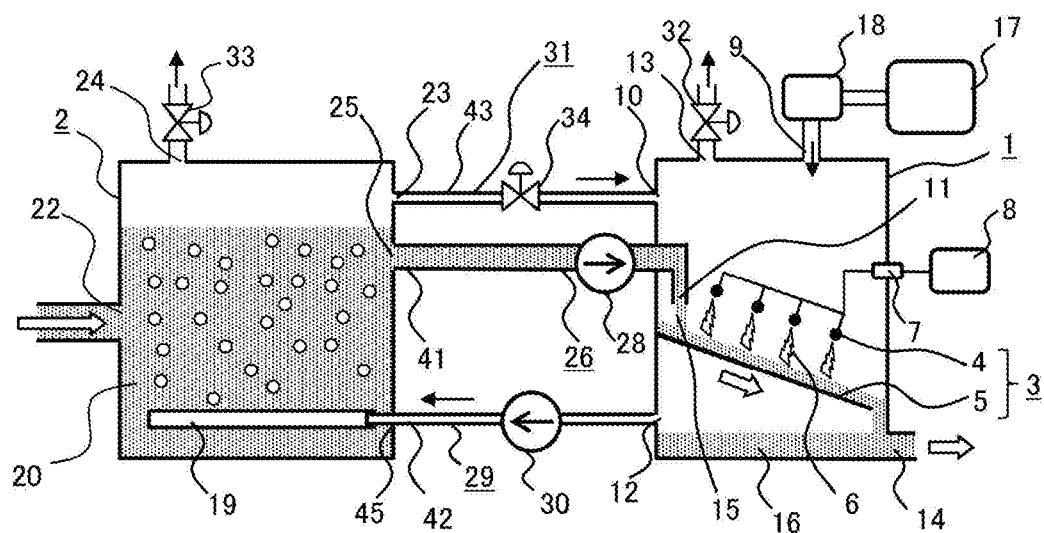
FIG. 1 is a cross-sectional view of a structure of a water treatment apparatus according to embodiment 1.

Preferred embodiments of a water treatment apparatus and a water treatment method according to the present disclosure will be described below in detail with reference to the accompanying drawings. Throughout the drawings, the same reference character denotes the same or equivalent component.

Embodiment 1

FIG. 1 is a cross-sectional view of a structure of a water treatment apparatus according to embodiment 1.

In the drawings, the water treatment apparatus includes: a treatment tank 1 that is a metal container having a mechanism for causing to-be-treated water to pass and flow therethrough, and generating electric discharge thereinside; and an ozone mixing portion 2 that is connected to the treatment tank 1, and that brings to-be-treated water to be supplied to the treatment tank 1 into contact with ozone-containing gas in advance, decomposes organic substances contained in to-be-treated water 20, and dissolves ozone into the to-be-treated water.

[Structure of Treatment Tank 1]

Firstly, the structure of the treatment tank 1 will be described with reference to FIG. 1.

The treatment tank 1 is implemented by a sealed metal container, and has an electric discharge unit 3 disposed thereinside for generating electric discharge. The electric discharge unit 3 has a flat-plate-like grounded electrode 5 and a plurality (four in the drawings) of wire-like high-voltage electrodes 4 opposing the grounded electrode 5. In the drawings, the cross-section of a wire of each high-voltage electrode 4 is illustrated, and the wire extends in the depth direction of the drawing sheet surface. The plurality of high-voltage electrodes 4 are disposed above the grounded electrode 5 at regular intervals. The high-voltage electrodes 4 aligned with each other are parallel with and spaced from the grounded electrode 5 over a certain distance. The high-voltage electrodes 4 are connected to each other by wiring. The wiring is connected to a high-voltage pulsed power supply 8 disposed outside the treatment tank 1 via a current feedthrough 7. The high-voltage electrodes 4 and a housing of the treatment tank 1 are electrically insulated from each other by the current feedthrough 7. The high-voltage pulsed power supply 8 applies a high voltage pulse to the high-voltage electrodes 4, to generate electric discharge 6 in a space between each high-voltage electrode 4 and the grounded electrode 5.

The electric discharge unit 3 is disposed so as to be tilted in the treatment tank 1. To-be-treated water 15 is supplied, through a water inlet port 11 connected to the ozone mixing portion 2, to a portion above the tilted electric discharge unit 3. The supplied to-be-treated water 15 flows downward on the tilted grounded electrode 5. A water discharge port 14 through which treated water 16 having been subjected to the water treatment is discharged to the outside of the water treatment apparatus is disposed at the lower portion of the treatment tank 1.

Meanwhile, the high-voltage electrodes 4 are disposed so as not to come into contact with the supplied to-be-treated water 15 in order to stabilize the electric discharge. The grounded electrode 5 is fixed to the inner side of the treatment tank 1 by a metal component. Thus, the grounded electrode 5 is electrically connected to the housing of the treatment tank 1 and has a ground potential.

Gas circulates throughout the treatment tank 1 and the ozone mixing portion 2, that is, in the water treatment apparatus. The treatment tank 1 has a gas sending port 12 through which gas is sent from the treatment tank 1, and a returned gas introduction port 10 through which gas having been sent through the gas sending port 12 and having circulated in the water treatment apparatus is returned into the treatment tank 1.

A gas inlet port 9 that is an introduction port through which gas is supplied to the treatment tank 1 and a gas discharge port 13 through which gas in the treatment tank 1 is discharged to the outside of the water treatment apparatus, are disposed at the upper portions of the treatment tank 1.

The gas inlet port 9 is connected to an oxygen gas source 17 via a mass flow controller 18, and the mass flow controller 18 controls a flow rate of gas to be supplied to the treatment tank 1.

A valve 32 is disposed at the gas discharge port 13, to regulate a flow rate of gas to be discharged.

The treatment tank 1 is sealed, and gas, to-be-treated water, and treated water flow in and out only through the gas inlet port 9, the returned gas introduction port 10, the gas sending port 12, the gas discharge port 13, the water inlet port 11, and the water discharge port 14, which are described above.

[Structure of Ozone Mixing Portion 2]

Next, a structure of the ozone mixing portion 2 will be described with reference to FIG. 1.

The ozone mixing portion 2 is implemented by a metal container, and can store the to-be-treated water 20 therein and has a mechanism for supplying gas to the stored to-be-treated water 20. The ozone mixing portion 2 initially stores the to-be-treated water 20, dissolves gas (ozone) into the to-be-treated water 20, and brings the to-be-treated water 20 into contact with the gas to decompose the organic substances in the to-be-treated water 20.

The ozone mixing portion 2 has a water inlet port 22. The to-be-treated water 20 is supplied from the outside of the water treatment apparatus through piping connected to the water inlet port 22, to store the to-be-treated water 20 in the ozone mixing portion 2. A gas discharge port 24 through which a part of gas in the ozone mixing portion 2 is discharged is disposed at the upper portion of the ozone mixing portion 2. A valve 33 is disposed at the gas discharge port 24 and regulates a flow rate of gas to be discharged.

A water sending port 25 through which the to-be-treated water 20 is supplied to the treatment tank 1 and a gas returning port 23 through which gas in the ozone mixing portion 2 is returned to the treatment tank 1 are disposed on the side opposing the water inlet port 22 side in the ozone mixing portion 2. The water sending port 25 is disposed at a position lower than the water surface of the stored to-betreated water 20, and the gas returning port 23 is disposed at a position higher than the water surface of the to-be-treated water 20.

A gas diffusing member 19 joined to the end of piping 42 that is connected to a gas introduction port 45 is disposed in the to-be-treated water 20 at the lower portion of the ozone mixing portion 2. The gas diffusing member 19 is a porous cylindrical or flat-plate-like member, and corresponds to a gas supply device for supplying gas sent from the treatment tank 1 as bubbles to the to-be-treated water 20. White circles in the to-be-treated water 20 represent bubbles.

The ozone mixing portion 2 is sealed similarly to the treatment tank 1, and gas and water flow in and out only through the gas returning port 23, the gas discharge port 24, the gas introduction port 45, the water inlet port 22, and the water sending port 25, which are described above. The to-be-treated water 20 passes through the ozone mixing portion 2 and is then supplied to the treatment tank 1. That is, the ozone mixing portion 2 is disposed preceding the treatment tank 1 in the flow in water treatment, and performs the first-step water treatment.

The reference character 20 of the to-be-treated water represents to-be-treated water which is supplied from the outside and stored in the ozone mixing portion 2, and reference character 15 represents to-be-treated water which has been subjected to the first-step water treatment and is supplied from the ozone mixing portion 2 to the treatment tank 1.

[Structure of Joining Portion Between Treatment Tank 1 and Ozone Mixing Portion 2]

Gas circulates between the treatment tank 1 and the ozone mixing portion 2, and to-be-treated water is sent from the ozone mixing portion 2 to the treatment tank 1. The structure of the joining portion between the treatment tank 1 and the ozone mixing portion 2 will be described.

A gas sending portion 29 is a flow path through which gas in the treatment tank 1 is supplied to the ozone mixing portion 2, and has the piping 42 and a gas sending pump 30 as gas sending means for suctioning gas in the treatment tank 1 and sending the gas to the ozone mixing portion 2. The piping 42 connects to and penetrates through the gas introduction port 45 of the ozone mixing portion 2, and joins the gas sending port 12 of the treatment tank 1 and the gas diffusing member 19 in the ozone mixing portion 2 to each other. An inverter (not shown) for adjusting an amount of gas to be sent is connected to the gas sending pump 30.

A gas returning portion 31 is a flow path through which gas in the ozone mixing portion 2 is returned to the treatment tank 1, has piping 43 and a valve 34 for controlling a flow rate, and is joined to the gas returning port 23 of the ozone mixing portion 2 and the returned gas introduction port 10 of the treatment tank 1.

A to-be-treated water inlet portion 26 is a flow path through which the to-be-treated water 20 in the ozone mixing portion 2 is supplied to the treatment tank 1, and piping 41 is connected to the water sending port 25 and the water inlet port 11. The piping 41 has a water sending pump 28 for supplying the to-be-treated water 15 to the treatment tank 1.

[Operation of Water Treatment Apparatus]

Next, an operation of the water treatment apparatus according to embodiment 1 will be described.

Firstly, circulation of gas will be described.

The water treatment apparatus according to embodiment 1 supplies oxygen gas to the treatment tank 1 and the ozone mixing portion 2 to perform water treatment. The oxygen gas is supplied from the oxygen gas source 17 through the gas inlet port 9 to the treatment tank 1 at a preset flow rate that is adjusted by the mass flow controller 18. The to-be-treated water 15 in the treatment tank 1 evaporates into water vapor, so that a humid high-oxygen-concentration atmosphere is formed in the treatment tank 1. In order to supply oxygen gas into the ozone mixing portion 2, gas in the treatment tank 1 is suctioned through the gas sending port 12 by the gas sending pump 30, is sent through the gas sending portion 29, and is then supplied from the gas diffusing member 19 to the to-be-treated water 20 stored in the ozone mixing portion 2. The sent gas forms bubbles in the to-be-treated water 20 and moves upward, and is then returned from the gas returning port 23 disposed at the upper portion of the ozone mixing portion 2 through the gas returning portion 31, and is returned through the returned gas introduction port 10 to the treatment tank 1.

Through the above-described operation, gas in the treatment tank 1 and the ozone mixing portion 2 circulates. That is, oxygen gas supplied from the gas inlet port 9 to the treatment tank 1 is sent to the ozone mixing portion 2, is supplied to the to-be-treated water 20 in the ozone mixing portion 2, and is then returned again to the treatment tank 1.

The gas in the treatment tank 1 is discharged through the gas discharge port 13. The flow rate for discharge through the gas discharge port 13 is controlled so as to be equal to a flow rate at which oxygen is supplied through the gas inlet port 9.

Next, an operation for water treatment by the water treatment apparatus will be described. In the water treatment apparatus, the to-be-treated water 20 supplied through the water inlet port 22 is initially stored in the ozone mixing portion 2. The to-be-treated water 20 in the ozone mixing portion 2 comes into contact with gas discharged from the gas diffusing member 19 by the circulation of gas as described above, is then suctioned through the water sending port 25 by the water sending pump 28 of the to-be-treated water inlet portion 26, and is supplied through the water inlet port 11 to the treatment tank 1. The to-be-treated water 15 is supplied to the treatment tank 1 at the upstream portion of the grounded electrode 5 of the electric discharge unit 3, forms a water film on the grounded electrode 5, and flows downward.

The electric discharge 6 is generated in a space between the high-voltage electrode 4 and the grounded electrode 5 in the electric discharge unit 3 by operating the high-voltage pulsed power supply 8. The to-be-treated water 15 comes into contact with the electric discharge 6 when passing through the discharge space, thereby performing the water treatment. The treated water 16 having been subjected to the treatment by the water treatment apparatus is discharged from the water discharge port 14.

Next, the principle of the water treatment in the treatment tank 1 of the water treatment apparatus and the function and effect of the ozone mixing portion 2 disposed preceding the treatment tank 1 will be described.

[Principle of Water Treatment by Electric Discharge]

In embodiment 1, when the to-be-treated water 15 flows downward on the upper surface of the grounded electrode 5, the to-be-treated water 15 comes into contact with the electric discharge 6 to decompose organic substances in the to-be-treated water, thereby performing the water treatment. The principle thereof will be described below. In the description herein, the decomposition of organic substances will be described as an example. However, it is well known that $O_3$ and OH radicals generated by electric discharge are also effective for sterilization, decolorization, and deodorization.

Oxygen molecules ($O_2$) and water molecules ($H_2O$) in the treatment tank 1 collide with high-energy electrons by the electric discharge 6, to cause dissociation reaction represented by the following formulae (1) and (2). In formulae (1) and (2), e represents an electron, O represents atomic oxygen, and H represents atomic hydrogen, and OH represents OH radical.

$$e + O_2 \rightarrow 2O \tag{1}$$

$$e + H_2O \rightarrow H + OH \tag{2}$$

A large part of atomic oxygen generated according to formula (1) is transformed into ozone ($O_3$) by the reaction represented by the following formula (3). In formula (3), M represents a third body in the reaction, and represents any molecule and atom in gas.

$$O + O_2 + M \rightarrow O_3 \tag{3}$$

A part of the OH radicals generated according to formula (2) is transformed into hydrogen peroxide ($H_2O_2$) by the reaction represented by the following formula (4).

$$OH + OH \rightarrow H_2O_2 \tag{4}$$

Oxidizing particles (O, OH, $O_3$, $H_2O_2$) generated by the reactions represented by formulae (1) to (4) react with organic substances near the water surface of the to-be-treated water 15 that flows on the upper surface of the grounded electrode 5 and oxidatively decompose the organic substances into carbon dioxide ($CO_2$) and water according to the following formula (5). In formula (5), R represents an organic substance to be treated.

$$R + (O, OH, O_3, H_2O_2) \rightarrow CO_2 + H_2O \tag{5}$$

O and OH which do not react with the organic substances according to formula (5) are transformed into $O_3$ and $H_2O_2$ having relatively long life spans as represented by formulae (3) and (4), and a part of $O_3$ and $H_2O_2$ is dissolved into the to-be-treated water 15 as represented by the following formulae (6) and (7). In formulae (6) and (7), (L) represents a liquid phase.

$$O_3 \rightarrow O_3(L) \tag{6}$$

$$H_2O_2 \rightarrow H_2O_2(L) \tag{7}$$

$O_3(L)$ and $H_2O_2(L)$ react in water to generate OH radicals as represented by the following formula (8).

$$O_3(L) + H_2O_2(L) \rightarrow OH(L) \tag{8}$$

$O_3(L)$, $H_2O_2(L)$, and $OH(L)$ generated according to formulae (6) to (8) react in water to decompose the organic substances as represented by the following formula (9).

$$R + (O_3(L), H_2O_2(L), OH(L)) \rightarrow CO_2 + H_2O \tag{9}$$

In embodiment 1, in a region in which the to-be-treated water 15 comes into direct contact with the electric discharge 6, that is, in the treatment tank 1, the organic substances in the to-be-treated water 15 are decomposed by both the reaction of formula (5) and the reaction of formula (9). Meanwhile, in the ozone mixing portion 2 that is a region in which the to-be-treated water 15 does not come into direct contact with the electric discharge, the organic substances in to-be-treated water are decomposed by the reaction of formula (9).

In embodiment 1, ozone generated by the electric discharge 6 in the treatment tank 1 is supplied to the to-be-treated water 20 in the ozone mixing portion 2. That is, an ozone generator need not be separately used.

In general, an ozone generator substantially reduces ozone generating efficiency due to mixing of water vapor. Therefore, oxygen gas in a dry state needs to be supplied. Furthermore, gas which has contacted with water contains water vapor, and is not reused and is discharged. Meanwhile, in embodiment 1, electric discharge is stably generated also in a humid atmosphere to generate ozone. In addition, circulation of gas enhances an ozone utilization rate. Thus, consumption of oxygen gas as a material of ozone is reduced, and cost required for the water treatment can be reduced.

In general, when gas is to be discharged, ozone-containing gas is discharged after ozone is decomposed by using ozone decomposing equipment. The higher a flow rate of discharged gas is, the greater the scale of the ozone decomposing equipment is. Meanwhile, in embodiment 1, a flow rate of gas to be discharged to the outside of the apparatus can be reduced by circulation of gas. That is, the ozone decomposing equipment can be downsized to reduce cost for the apparatus.

The ozone decomposing equipment, which are not shown, are connected to the gas discharge port 13 via the valve 32 and to the gas discharge port 24 via the valve 33.

[Adjustment of Ozone Concentration]

Adjustment of an ozone concentration is important for enhancing efficiency of the water treatment. A method for adjusting an ozone concentration by the water treatment apparatus according to embodiment 1 will be described below.

Firstly, adjustment of a concentration of oxygen for generating ozone will be described.

When the water treatment apparatus is started up, the water treatment apparatus is filled with air, and the oxygen concentration may not be a sufficient oxygen concentration required for the water treatment. Therefore, in a case where the oxygen concentration is low, the substitution of gas in the water treatment apparatus is performed as follows.

Oxygen gas having a flow rate adjusted by the mass flow controller 18 is supplied from the oxygen gas source 17 through the gas inlet port 9 to the treatment tank 1. Simultaneously, gas in the treatment tank 1 and the ozone mixing portion 2 are circulated through the gas sending portion 29 and the gas returning portion 31. Gas is discharged through the gas discharge port 13 to the outside of the water treatment apparatus. That is, the supply of oxygen gas and circulation and discharge of gas are merely performed as in the above-described operation.

Meanwhile, generation of the electric discharge 6 by the electric discharge unit 3 and supply of the to-be-treated water 15 to the treatment tank 1 are not performed. The substitution of gas is performed until the concentration of oxygen in the water treatment apparatus reaches a sufficient concentration required for the water treatment. An oxygen supply flow rate by the mass flow controller 18 may be adjusted so as to be higher than that in the operation. Thus, substitution of air in the apparatus can be performed and the oxygen concentration can reach a sufficient concentration required for the water treatment in a short time period.

Next, adjustment of an ozone concentration will be described.

After the substitution of gas, when the ozone concentration is low, an ozone generating operation is performed as follows until a predetermined ozone concentration is reached.

Oxygen gas having a flow rate adjusted by the mass flow controller 18 is supplied from the oxygen gas source 17 through the gas inlet port 9 into the treatment tank 1.

Simultaneously, gas in the treatment tank 1 and the ozone mixing portion 2 is circulated through the gas sending portion 29 and the gas returning portion 31. Gas is discharged through the gas discharge port 13 to the outside of the water treatment apparatus. The electric discharge 6 is generated by the electric discharge unit 3. That is, supply of oxygen gas, circulation and discharge of gas, and generation of the electric discharge are merely performed as in the above-described operation. Meanwhile, the to-be-treated water 15 is not supplied to the treatment tank 1. Thus, the water treatment is not performed in the treatment tank 1, and generation of ozone by the electric discharge 6 and storage of ozone are merely performed.

The ozone generating operation is performed until a predetermined concentration is reached. After the predetermined ozone concentration has been reached, the to-be-treated water 15 is supplied to the treatment tank 1 to start the water treatment.

The water treatment in the treatment tank 1 can be performed with higher efficiency when the ozone concentration is higher. Therefore, the water treatment is preferably performed after the above-described ozone generating operation is performed to adjust the ozone concentration.

When the ozone generating operation is not performed, the ozone concentration is low immediately after the start of the water treatment, and the ozone concentration increases over time, and is saturated when the concentration becomes a concentration in a steady state. Therefore, the efficiency of the water treatment is lower than that in a steady state until the ozone concentration is saturated. In order to enhance the efficiency, the scales of the treatment tank 1 and the ozone mixing portion 2 need to be increased.

The ozone generating operation allows enhancement of efficiency of the water treatment without enlarging the apparatus.

As described above, according to embodiment 1, before the to-be-treated water 20 is treated by the electric discharge 6, the water treatment is performed by the ozone mixing portion 2 with the use of ozone generated by electric discharge. Therefore, an ozone utilization rate can be enhanced with a simple apparatus structure and organic substances can be efficiently decomposed.

That is, by bringing the to-be-treated water 20 into contact with ozone in the ozone mixing portion 2, organic substances that can be treated by ozone can be decomposed. The organic substances decomposable by ozone can be treated and decomposed by ozone in the ozone mixing portion 2 with higher efficiency as compared with a case where the organic substances are treated by OH radicals in the treatment tank 1. Therefore, the substances are decomposed by the preceding ozone mixing portion 2, whereby OH radicals can be caused to selectively react with persistent substances in the following treatment tank 1, so that the efficiency of the water treatment can be enhanced as a whole.

The containers are separately provided such that the ozone mixing portion 2 is used as a preceding container and the treatment tank 1 is used as a following container, thereby enhancing the efficiency of the water treatment with a simple structure.

In embodiment 1, a high-oxygen-concentration atmosphere is formed in the treatment tank 1. Meanwhile, as long as oxygen is contained, ozone and active species are generated, and, thus, the water treatment can be performed. However, the higher the oxygen concentration is, the higher the concentrations of ozone and active species are and the higher the reaction rate is. Therefore, the high-oxygen-concentration atmosphere is preferable.

A flow rate at which oxygen is supplied to the water treatment apparatus in operation is adjusted based on the analysis result of gas in the treatment tank 1. For example, the concentration of oxygen in the treatment tank 1 is measured, and the flow rate at which oxygen is supplied is adjusted such that the oxygen concentration does not become less than 90%. In general, the concentration of oxygen in gas generated by an oxygen enricher is higher than or equal to 90%, and, when the oxygen concentration is less than 90%, an amount of supplied oxygen is insufficient, and a flow rate at which oxygen is supplied needs to be increased. Thus, the apparatus is filled and operated with only a minimum amount of oxygen required for the water treatment, thereby reducing cost for oxygen.

A flow rate at which oxygen is supplied to the water treatment apparatus may be determined based on the quality of to-be-treated water. An amount of oxygen required for the water treatment is the sum of an amount of oxygen to be dissolved into the to-be-treated water and an amount of oxygen required for decomposing organic substances. Therefore, when the concentration of the organic substances is high, a required amount of oxygen increases, and, thus, the flow rate at which oxygen is supplied is preferably increased.

Gas may be discharged from the water treatment apparatus to the outside through not only the gas discharge port 13 but also the gas discharge port 24. Gas may be simultaneously discharged through both of them. However, the flow rates are controlled by the valve 32 at the gas discharge port 13 and the valve 33 at the gas discharge port 24 such that the total of a flow rate at which gas is discharged through the gas discharge port 13 and a flow rate at which gas is discharged through the gas discharge port 24 is equal to a flow rate at which oxygen is supplied.

For example, when a large amount of gas such as nitrogen or carbon dioxide is dissolved in the to-be-treated water, nitrogen or carbon dioxide may be expelled and vaporized in the gas according to supply of ozone for the preceding treatment. In this case, the concentration of oxygen in the ozone mixing portion 2 may be lowered. Therefore, a proportion of the flow rate at which gas is discharged through the gas discharge port 24 may be increased. Thus, reduction of the concentration of oxygen in the treatment tank 1 can be minimized.

When the gas discharge flow rate is equal to the oxygen supply flow rate, ozone-containing gas can be prevented from flowing to the outside and air can be prevented from being mixed from the outside, and reduction of the oxygen concentration can be inhibited.

In embodiment 1, the inverter (not shown) connected to the gas sending pump 30 corresponds to a flow rate controller of the gas sending pump 30. Therefore, the flow rate of gas that circulates through the gas sending portion 29 and the gas returning portion 31 can be adjusted by the gas sending pump 30 disposed in the gas sending portion 29 and the valve 34 disposed in the gas returning portion 31.

While the water treatment apparatus is operating, a flow rate of circulating gas is preferably adjusted to be higher than a flow rate at which oxygen is supplied. For example, the flow rate of circulating gas is adjusted to be higher than or equal to 20 times the flow rate at which oxygen is supplied and less than or equal to 1000 times the flow rate at which oxygen is supplied. In a case where the flow rate of circulating gas is less than 20 times the flow rate at which oxygen is supplied, ozone is insufficiently supplied to the to-be-treated water 20 in the ozone mixing portion 2, and decomposition of organic substances becomes insufficient.

The higher the flow rate of circulating gas is, the more frequently gas is exposed to the electric discharge 6, and ozone can be more efficiently generated and organic substances can be efficiently decomposed. Meanwhile, in a case where the flow rate of circulating gas is higher than 1000 times the flow rate at which oxygen is supplied, power consumption by the gas sending pump 30 increases and heat generation from the gas sending pump 30 increases. Thus, the temperature of the circulating gas increases and the decomposition of ozone thus increases, thereby hindering the reaction and reducing the treatment efficiency.

The flow rate of circulating gas may be controlled based on the analysis result of to-be-treated water. For example, the concentration of ozone dissolved in the to-be-treated water 20 in the ozone mixing portion 2 is measured, and, when the concentration is low, a flow rate of circulating gas is increased to increase an amount of ozone to be supplied. Such an operation allows an amount of supplied ozone to be appropriately controlled.

The internal pressure in each of the treatment tank 1 and the ozone mixing portion 2 is preferably atmospheric pressure or close thereto such that water is easily supplied or discharged by the water treatment apparatus.

Figure 2:
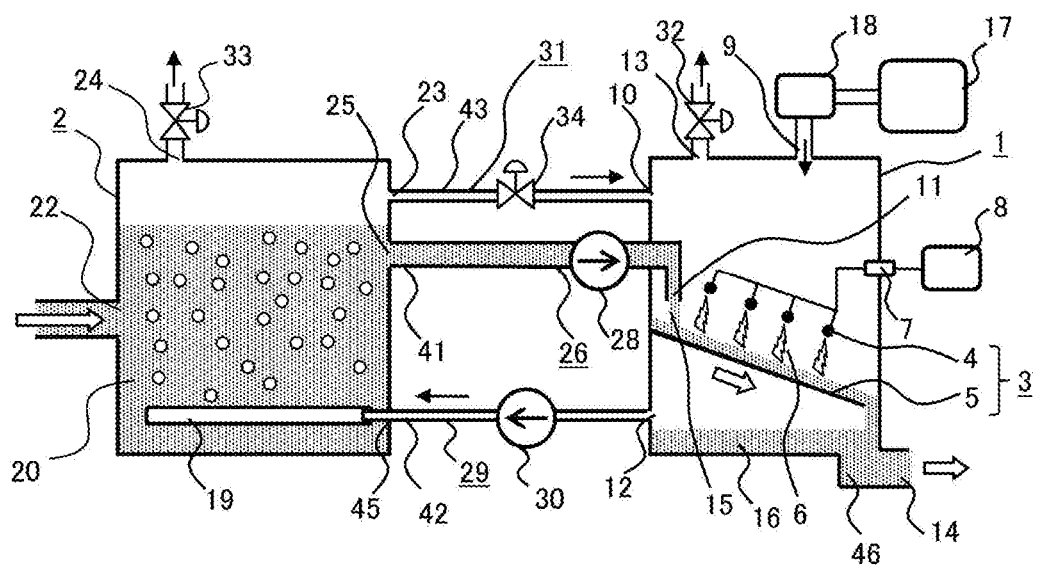
FIG. 2 is a cross-sectional view of a structure of another water treatment apparatus according to embodiment 1.

The pressure in the ozone mixing portion 2 can be controlled by the valve 34 disposed in the gas returning portion 31. For example, the pressure in the ozone mixing portion 2 may be increased by reducing a flow rate of gas flowing in the gas returning portion 31 with the use of the valve 34. In general, the higher the gas pressure in a gas phase is, the higher the efficiency for dissolving ozone into water is. Therefore, ozone can be efficiently dissolved into to-be-treated water in the ozone mixing portion 2, and the organic substances can be efficiently decomposed. In this case, since the internal pressure in the treatment tank 1 becomes a negative pressure, a water storage portion for storing the treated water 16 is disposed at the lower portion of the treatment tank 1, and the water surface of the treated water 16 is preferably located at a position higher than the water discharge port 14. FIG. 2 shows a water treatment apparatus in which a water storage portion 46 for the treated water 16 is disposed at the lower portion of the treatment tank 1. Thus, mixture of air in the treatment tank 1 can be prevented.

In embodiment 1, to-be-treated water is supplied from the ozone mixing portion 2 to the treatment tank 1 only through the to-be-treated water inlet portion 26. The to-be-treated water inlet portion 26 is filled with the to-be-treated water, to prevent mixture of gas in the water sending pump 28.

By supply of gas to the to-be-treated water 20 in the ozone mixing portion 2, nitrogen dissolved in the to-be-treated water 20 can be expelled to a gas phase by oxygen in the supplied gas, and can be discharged through the gas discharge port 13 or the gas discharge port 24 to the outside of the water treatment apparatus. In the water treatment in the ozone mixing portion 2 and the treatment tank 1, nitrogen dissolved in the to-be-treated water is oxidized to generate nitric acid and pH of the to-be-treated water is lowered. In the water treatment technique according to the present embodiment, it is known that reaction efficiency is maximized in a neutral region. Therefore, in the operation of the water treatment apparatus according to the present embodiment, pH can be inhibited from being lowered by removing dissolved nitrogen, and high efficiency treatment can be performed.

In embodiment 1, a distance between the high-voltage electrode 4 and the grounded electrode 5 is not particularly limited as long as to-be-treated water flows and electric discharge is generated. However, the distance is preferably greater than or equal to 5 mm and preferably less than or equal to 15 mm. In a case where the distance is greater than or equal to 5 mm, also when the water film of to-be-treated water passes, a space between the high-voltage electrode 4 and the grounded electrode 5 is not submerged in water, and electric discharge can be uniformly generated with stability. Meanwhile, the wider the space is, the higher the voltage required for generating the electric discharge is. The higher the voltage is, the more difficult insulation of a non-discharge portion is, whereby cost for a device for insulation increases.

FIG. 1 shows the electric discharge unit 3 that includes the flat-plate-like grounded electrode 5 and a plurality of the wire-like high-voltage electrodes 4. However, as long as the electric discharge unit 3 is structured such that the high-voltage electrode and the grounded electrode oppose each other so as to maintain a constant space and the electric discharge is generated in the space, the shape of the electric discharge unit 3 is not limited. As long as the high-voltage electrode 4 is shaped such that the electric field is concentrated to generate the electric discharge, the shape of the high-voltage electrode 4 is not limited. In the drawings, the to-be-treated water 15 passes on the tilted surface through the discharge space as a water film. However, as long as the to-be-treated water passes through the discharge space, the shape of the passing to-be-treated water and the moving direction thereof are not limited.

In the drawings, an exemplary case where the number of the electric discharge units 3 is one is shown. However, a plurality of the electric discharge units 3 may be disposed in the treatment tank 1 so as to be in series or parallel with respect to the direction in which the to-be-treated water passes. When a plurality of the electric discharge units are disposed, an amount of water which can be treated per unit time increases, and the treatment can be performed at a higher speed, and to-be-treated water containing organic substances at a high concentration can be treated.

An exemplary case where the treatment tank 1 and ozone mixing portion 2 are sealed metal containers is described. A material having excellent corrosion resistance is preferably used for a member of the water treatment apparatus. For example, as the metal, stainless steel or titanium can be used. For example, as a dielectric material, fluororesin, glass, or ceramics can be used.

FIG. 1 and FIG. 2 show an exemplary case where the to-be-treated water 15 is supplied, from the water inlet port 11 connected to the ozone mixing portion 2, to the upper portion of the electric discharge unit 3 that is tilted. Meanwhile, an example of a water treatment apparatus having another electric discharge unit will be described below.

Figure 3:
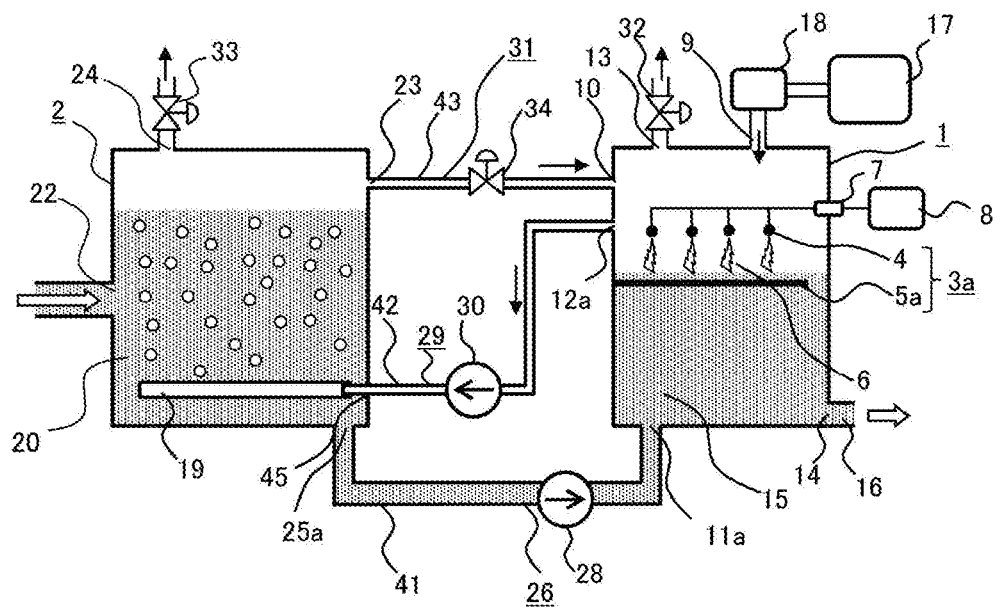
FIG. 3 is a cross-sectional view of a structure of still another water treatment apparatus according to embodiment 1.

FIG. 3 is a cross-sectional view of a structure of another water treatment apparatus according to embodiment 1. The water treatment apparatus shown in FIG. 3 is different from the water treatment apparatuses shown above in FIG. 1 and FIG. 2 in the structure of the treatment tank 1 and a position at which the to-be-treated water inlet portion 26 connects between the ozone mixing portion 2 and the treatment tank 1.

In FIG. 3, the treatment tank 1 stores the to-be-treated water 15, and includes an electric discharge unit 3a which has a flat-plate-like grounded electrode 5a, having a plurality of openings, disposed under and near the water surface of the to-be-treated water 15, and a plurality (four in the drawings) of wire-like high-voltage electrodes 4. The wire-like high-voltage electrodes 4 are disposed at regular intervals above the water surface of the to-be-treated water 15 so as to be parallel with the water surface. The grounded electrode 5a is electrically connected to the housing of the treatment tank 1 and has a ground potential. The water inlet port 11a is disposed at the bottom portion of the treatment tank 1. The water sending port 25a is disposed at the bottom portion of the ozone mixing portion 2. The to-be-treated water inlet portion 26 is disposed at the lower portion of the water treatment apparatus so as to connect between the water inlet port 11a and the water sending port 25a. As long as the water inlet port 11a is disposed at the lower portion of the treatment tank 1, the water inlet port 11a may not be disposed at the bottom portion. As long as the water sending port 25a is disposed at the lower portion of the ozone mixing portion 2, the water sending port 25a may not be disposed at the bottom portion.

The gas sending port 12a of the treatment tank 1 is disposed at the upper portion of the treatment tank 1 above the water surface of the to-be-treated water 15. The other components are the same as shown in FIG. 1 and FIG. 2.

Next, an operation of the water treatment apparatus shown in FIG. 3 will be described.

In the water treatment apparatus shown in FIG. 3, the to-be-treated water 15 is supplied from the ozone mixing portion 2 to the treatment tank 1 until a certain amount of the to-be-treated water 15 is supplied. The certain amount represents an amount of water having a water surface level that allows the flat-plate-like grounded electrode 5a to be submerged under and near the water surface, and allows the wire-like high-voltage electrodes 4 to be not in contact with the water surface. When the certain amount of the to-be-treated water 15 has been supplied, supply of the to-be-treated water 15 to the treatment tank 1 is halted. While the supply of to-be-treated water 15 to the treatment tank 1 is halted, discharge of water from the water discharge port 14 is also halted. By operating the high-voltage pulsed power supply 8, streamer discharge 6 is generated in a space between the high-voltage electrodes 4 of the electric discharge unit 3a and the water surface of the to-be-treated water 15. By the electric discharge 6 coming into direct contact with the to-be-treated water 15, the water treatment is performed. While the water treatment is performed, ozone is generated in the treatment tank 1.

After elapse of a certain time period, organic substances contained in the to-be-treated water 15 in the treatment tank 1 are decomposed, and the to-be-treated water 15 becomes the treated water 16. All the treated water 16 stored in the treatment tank 1 is discharged through the water discharge port 14. After the treated water has been discharged, the to-be-treated water 15 is supplied from the ozone mixing portion 2 through the to-be-treated water inlet portion 26 to the treatment tank 1.

The to-be-treated water 20 is stored in the ozone mixing portion 2. As in FIG. 1, gas in the treatment tank 1 is supplied through the gas sending portion 29 to the ozone mixing portion 2, and gas in the ozone mixing portion 2 is returned through the gas returning portion 31, to circulate the gas. Thus, based on the same principle as in FIG. 1, organic substances contained in the to-be-treated water 20 in the ozone mixing portion 2 are brought into contact with ozone and decomposed, and the ozone is dissolved into the to-be-treated water 20. Gas may be sent from the treatment tank 1 to the ozone mixing portion 2 regardless of a time period during which the water treatment is performed in the treatment tank 1. The to-be-treated water 20 in the ozone mixing portion 2 is supplied to the treatment tank 1 as the to-be-treated water 15 having been subjected to the first-step water treatment.

In FIG. 3, as long as the grounded electrode 5a can be disposed under the water surface of the to-be-treated water 15, the grounded electrode 5a can have any shape. The grounded electrode 5 may have a bar-like or wire-like shape. In Embodiment 1, the stored to-be-treated water 15 plays the same role as the grounded electrode 5a, and, therefore, the grounded electrode 5a may not be disposed. Electric discharge may be generated between the to-be-treated water 15 and the high-voltage electrodes 4 to perform the water treatment.

Meanwhile, in a case where the conductivity of the to-be-treated water 15 is less than or equal to 1 mS/cm, the electric current caused by the electric discharge 6 passes in the to-be-treated water to increase Joule loss, and energy consumption which does not contribute to the water treatment increases, thereby reducing efficiency of the water treatment. Therefore, the grounded electrode 5a is preferably disposed.

The grounded electrode 5a is preferably disposed under the water surface such that the distance from the water surface is from 5 mm to 10 mm. In a case where the grounded electrode 5a is disposed under the water surface such that the distance from the water surface is greater than 10 mm, the electric resistance of the to-be-treated water increases to reduce the efficiency of the water treatment. Meanwhile, in a case where the grounded electrode 5a is disposed under the water surface such that the distance from the water surface is less than 5 mm, distribution of water above the grounded electrode 5a becomes uneven, and a distance between the high-voltage electrode 4 and the water surface of to-be-treated water as the ground potential or a distance between the high-voltage electrode 4 and the grounded electrode 5a is not uniform, and spark discharge is thus likely to be generated.

The grounded electrode 5a preferably has a flat-plate-like shape since electric resistance can be reduced. Meanwhile, when the grounded electrode 5a is a flat plate, it is difficult to stir the to-be-treated water 15 located below and above the grounded electrode 5a, and the water treatment for the to-be-treated water 15 does not progress at a lower position distant from electric discharge. Therefore, in a case where the grounded electrode 5a has a flat-plate-like shape, the grounded electrode 5a preferably has a plurality of openings, to stir to-be-treated water above and below the grounded electrode 5a.

In the drawings, the high-voltage electrode 4 is a wire-like electrode. However, as long as the electric field is concentrated to generate electric discharge, and to-be-treated water and the electric discharge are brought into contact with each other, the shape of the high-voltage electrode 4 is not limited. For example, the high-voltage electrode 4 may be implemented by a single or a plurality of needle electrodes that oppose the grounded electrode 5a across the water surface or a Kenzan-pin-holder-shaped high-voltage electrode that opposes the grounded electrode 5a across the water surface. The high-voltage electrode 4 may be a flat-plate-like high-voltage electrode that is disposed parallel with the grounded electrode 5 across the water surface.

A necessary amount of the to-be-treated water 15 to be supplied to the treatment tank 1 is a certain amount. The to-be-treated water 15 which has been once supplied to the treatment tank 1 is not discharged from the treatment tank 1 until the water treatment ends.

In the water treatment apparatus shown in FIG. 1, in a case where a content of persistent substances in to-be-treated water is great, the treatment conditions are adjusted by, for example, increasing the number of the electric discharge units and increasing power to be supplied. However, in the water treatment apparatus shown in FIG. 3, the treatment time may be adjusted and the necessary number of the electric discharge units can be minimized, thereby contributing to reduction of cost for the apparatus.

An example of a water treatment apparatus using still another electric discharge unit will be described below.

Figure 4A:
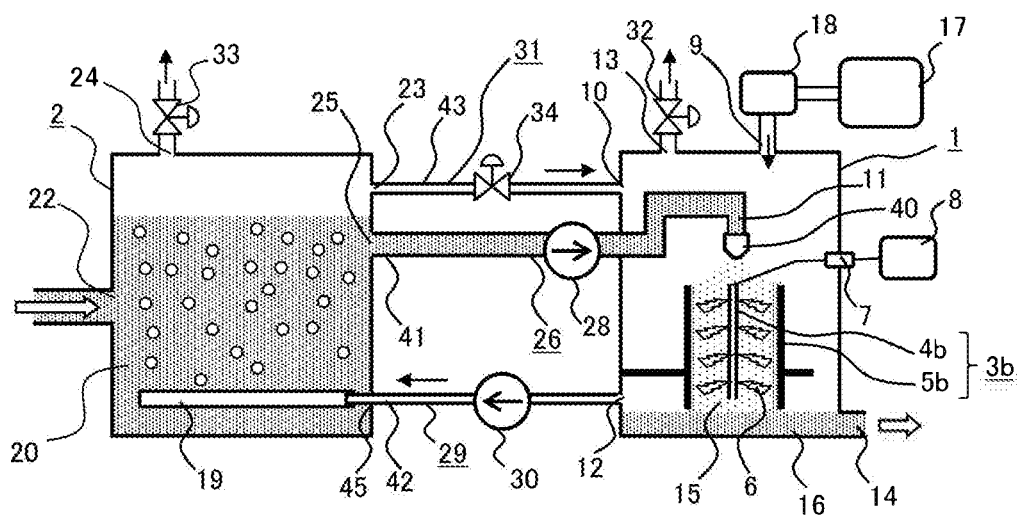
FIG. 4A is a cross-sectional view of a structure of still another water treatment apparatus according to embodiment 1.

FIG. 4A is a cross-sectional view of a structure of the still another water treatment apparatus according to embodiment 1. The water treatment apparatus shown in FIG. 4A is different from the water treatment apparatuses shown in FIGS. 1 to 3 in the structure of the electric discharge unit 3 in the treatment tank 1. A cylindrical grounded electrode 5b is disposed in the treatment tank 1 such that the central axis of the grounded electrode 5b extends in the vertical direction. The grounded electrode 5b is fixed to the side surface of the housing of the treatment tank 1 by a metal component. Thus, the grounded electrode 5b is electrically connected to the housing and has a ground potential. A wire-like high-voltage electrode 4b is disposed in the grounded electrode 5b along the central axis of the grounded electrode 5b. That is, a gap is formed between the high-voltage electrode 4b and the inner surface of the grounded electrode 5b so as to maintain a constant distance. The high-voltage electrode 4b is connected to the high-voltage pulsed power supply 8 outside the treatment tank 1 through the current feedthrough 7 by the wiring. The high-voltage electrode 4b and the housing of the treatment tank 1 are electrically insulated from each other by the current feedthrough 7. The water inlet port 11 has a nozzle 40 for turning the to-be-treated water 15 into water droplets and dispersing the water droplets. The other components are the same as shown in FIG. 1.

Next, an operation of the water treatment apparatus shown in FIG. 4A will be described.

In the water treatment apparatus shown in FIG. 4A, the to-be-treated water 15 supplied through the to-be-treated water inlet portion 26 to the treatment tank 1 is turned into water droplets and dispersed by the nozzle 40 disposed at the water inlet port 11. The to-be-treated water 15 as the water droplets drops in the vertical direction, and passes through the gap between the high-voltage electrode 4b and the grounded electrode 5b. A part of the to-be-treated water collides with the inner surface of the grounded electrode 5b to form a water film, and flows downward. By operating the high-voltage pulsed power supply 8, the streamer discharge 6 is uniformly generated from the high-voltage electrode 4b toward the inner surface of the grounded electrode 5b, and the water droplets of the to-be-treated water 15 and the to-be-treated water 15 that flows downward on the inner surface of the grounded electrode 5b are brought into contact with the electric discharge 6, thereby performing the water treatment. Since ozone is generated by the electric discharge 6, gas in the treatment tank 1 is supplied through the gas sending portion 29 to the ozone mixing portion 2, and gas in the ozone mixing portion 2 is returned through the gas returning portion 31 to the treatment tank 1, to circulate the gas. Ozone is supplied to the ozone mixing portion 2 by the circulation of the gas, and organic substances in the to-be-treated water 20 are decomposed in the ozone mixing portion 2, and ozone can be dissolved into the to-be-treated water 20, similarly to FIG. 1.

By turning the to-be-treated water 15 into water droplets, an area in which the to-be-treated water 15 and the electric discharge contact with each other can be increased. Thus, an amount of active species to be supplied to the to-be-treated water 15 increases, so that the water treatment can be efficiently performed at a high speed.

Figure 4B:
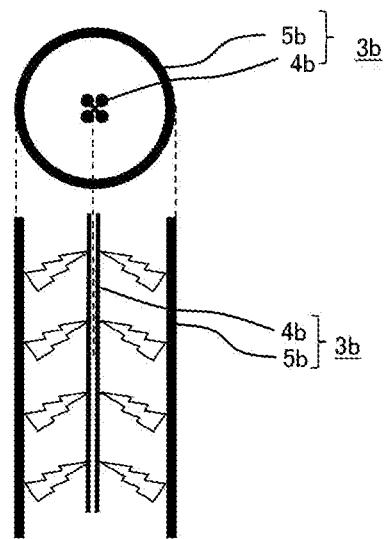
FIG. 4B is an enlarged view of an electric discharge unit shown in FIG. 4A.

FIG. 4B is an enlarged view of the electric discharge unit 3b. The upper side portion of FIG. 4B shows the electric discharge unit 3b as viewed from thereabove, and the lower side portion of FIG. 4B shows the longitudinal cross-section. An exemplary case where the high-voltage electrode 4b is formed by four wires, and all the wires are disposed apart from the central axis of the grounded electrode 5b over an equal distance, is shown. Thus, a plurality of wires are used as a plurality of high-voltage electrodes 4b opposing the grounded electrode 5b, whereby the electric current is dispersed to reduce the density of the electric current, and the stable streamer discharge can be generated. That is, electric discharge can be uniformly generated in the cylindrical grounded electrode 5b.

FIG. 4A shows the grounded electrode 5b as a cylindrical tube. However, as long as the grounded electrode 5b is a cylindrical tube that is coaxial with the wire-like high-voltage electrode 4b, the grounded electrode 5b may have an opening on the side surface. The opening allows reduction of water droplets that collide with the inner surface of the grounded electrode 5b, and allows the water film flowing downward on the inner surface to be thin. Thus, variation in distance of the gap due to the uneven thickness of the water film can be reduced, and the electric discharge 6 can be uniformly generated with stability.

In FIG. 4A, the number of the electric discharge units 3b disposed in the treatment tank 1 is one. However, a plurality of the electric discharge units 3b may be aligned in parallel in the treatment tank 1. In the drawings, the electric discharge unit 3b is formed by the wire-like high-voltage electrode 4b and the cylindrical grounded electrode 5b. However, as long as the high-voltage electrode and the grounded electrode oppose each other so as to maintain a constant space, and electric discharge is generated in the space, the shape of the electric discharge unit 3b is not particularly limited.

In FIG. 4A, the nozzle 40 disperses the to-be-treated water 15 vertically downward. However, the direction in which the to-be-treated water 15 is dispersed is not limited as long as the to-be-treated water 15 dispersed as water droplets passes through a space in which the electric discharge 6 is generated, and can be brought into contact with the electric discharge 6.

For example, a plurality of openings each having such a size as to pass a water droplet may be formed on the side surface of the grounded electrode 5b, and to-be-treated water may be horizontally dispersed from the side surface. In this case, while the water droplet of the to-be-treated water 15 having been dispersed is being horizontally moved, the water droplet can be caused to pass through the opening formed in the grounded electrode 5b and the space in which the electric discharge is generated, and can be brought into contact with the electric discharge, to perform the water treatment. Furthermore, when a plurality of the same type of electric discharge units 3b are disposed in parallel, water droplets of to-be-treated water pass through the first electric discharge unit 3b, and can thereafter come into contact with the electric discharge in the second electric discharge unit 3b. That is, by horizontally dispersing to-be-treated water, a time until the to-be-treated water drops increases, and the to-be-treated water more frequently comes into contact with the electric charge, thereby performing the treatment with high efficiency.

Embodiment 2

Figure 5:
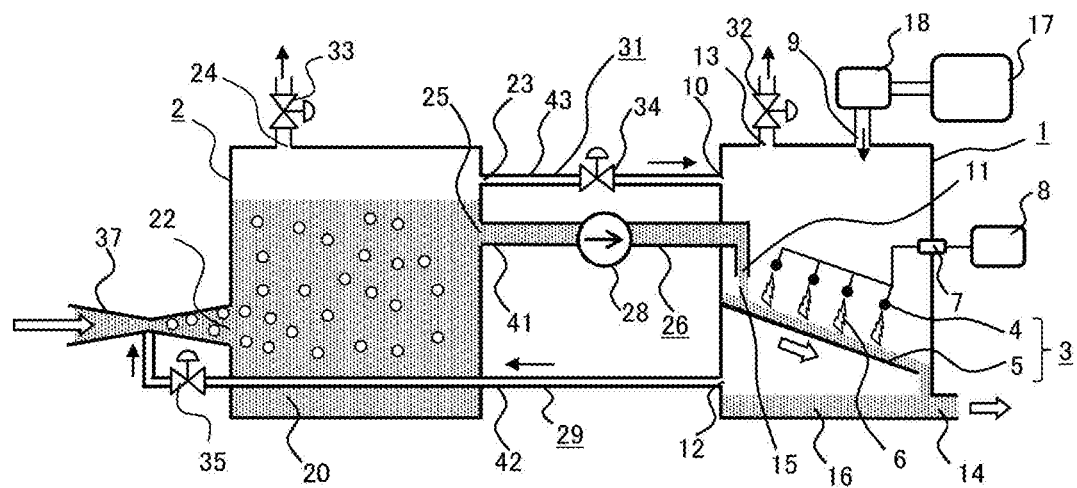
FIG. 5 is a cross-sectional view of a structure of a water treatment apparatus according to embodiment 2.

FIG. 5 is a cross-sectional view of a structure of a water treatment apparatus according to embodiment 2.

Embodiment 2 is different from embodiment 1 in that an ejector 37 for suctioning gas in the treatment tank 1, mixing the gas with the to-be-treated water 20, and supplying the gas and the to-be-treated water 20 to the ozone mixing portion 2 is disposed at the water inlet port 22, in embodiment 2. One end of the gas sending portion 29 is connected to the ejector 37, and the gas sending portion 29 has a valve 35. Meanwhile, the gas diffusing member 19 and the gas sending pump 30 of embodiment 1 are not disposed. Piping 42 of the gas sending portion 29 is connected to a gas suctioning portion of the ejector 37. The gas sending portion 29 need not penetrate through the ozone mixing portion 2, and may extend around the periphery of the ozone mixing portion 2. The other components are the same as those in embodiment 1 described above.

An operation of the water treatment apparatus of embodiment 2 will be described with reference to FIG. 5.

In the water treatment apparatus of embodiment 2, when the to-be-treated water 20 is supplied to the ozone mixing portion 2 from the outside of the water treatment apparatus, the ejector 37 suctions gas from the treatment tank 1 through the gas sending port 12 and the gas sending portion 29, and supplies the to-be-treated water 20 and the gas into the ozone mixing portion 2 while mixing the to-be-treated water 20 and the gas. That is, the ejector 37 corresponds to a gas supply device and gas sending means for sending gas from the treatment tank 1. A gas flow rate is adjusted by the valve 35. The gas supplied to the ozone mixing portion 2 is stored in the upper portion of the ozone mixing portion 2, and the gas is then returned from the returned gas introduction port 10 to the treatment tank 1 through the gas returning portion 31 connected to the gas returning port 23, to circulate the gas between the treatment tank 1 and the ozone mixing portion 2.

In the ozone mixing portion 2, ozone and organic substances in the to-be-treated water 20 are caused to react with each other to decompose the organic substances. The to-be-treated water 20 is suctioned by the water sending pump 28, and is supplied to the treatment tank 1 through the to-be-treated water inlet portion 26. The supplied to-be-treated water 15 is treated in the treatment tank 1 as in embodiment 1.

In embodiment 2, power for operating the ejector 37 is not required anew. Furthermore, since gas in the treatment tank 1 is suctioned by the ejector 37, power for sending gas need not be separately provided. Therefore, cost for power can be reduced.

Furthermore, to-be-treated water and gas are mixed in the ejector 37. Therefore, efficiency for dissolving ozone is enhanced, and decomposition of organic substances by the dissolved ozone can be promoted. Accordingly, the ozone mixing portion 2 can be downsized, and cost for the apparatus can be reduced.

As described above, according to embodiment 2, the same effect as in embodiment 1 is exhibited.

Since the ejector 37 is used, efficiency for dissolving ozone into to-be-treated water is enhanced, and decomposition of organic substances by ozone is promoted. Therefore, the ozone mixing portion 2 can be downsized. Furthermore, since the ejector 37 is used, a pump for sending gas from the treatment tank 1 need not be disposed, thereby contributing to reduction of the size of the apparatus and reduction of power.

In the structure shown in FIG. 5, the ejector 37 is disposed at the water inlet port 22. However, a bypass water inlet port 52 for circulating the to-be-treated water 20 in the ozone mixing portion 2 may be disposed, and the ejector 37 may be disposed at the bypass water inlet port 52.

Figure 6:
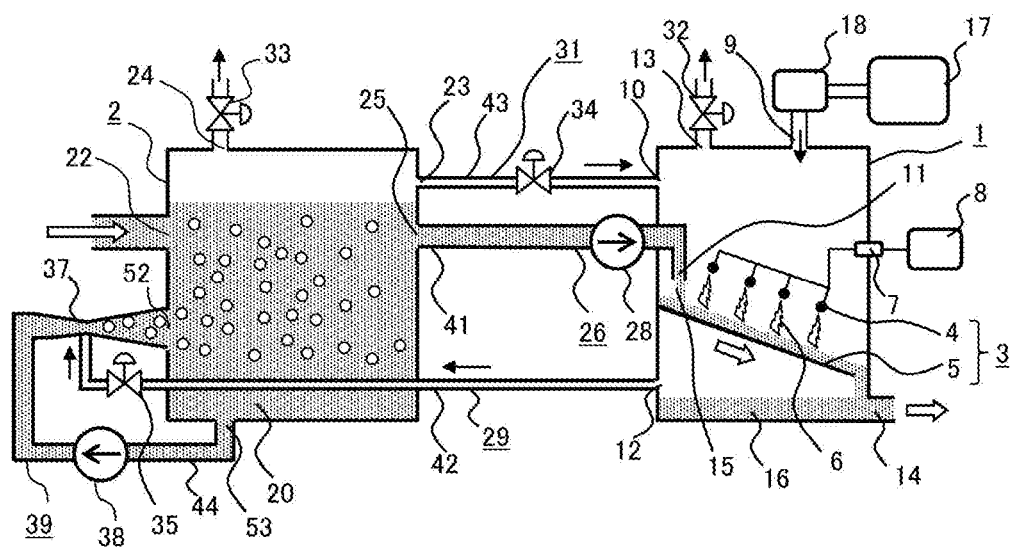
FIG. 6 is a cross-sectional view of a structure of another water treatment apparatus according to embodiment 2.

FIG. 6 is a cross-sectional view of a structure of another water treatment apparatus according to embodiment 2. The ozone mixing portion 2 has a bypass water circulating portion 39 disposed between a bypass water sending port 53 and the bypass water inlet port 52. The bypass water circulating portion 39 has the piping 44 connected to the bypass water sending port 53, a pump 38, and the ejector 37 connected to the piping 42 via the valve 35, and circulates the to-be-treated water 20 in the ozone mixing portion 2. An inverter is connected to the pump 38 (not shown). The bypass water inlet port 52 as a discharge port of the bypass water circulating portion 39 is disposed below the water inlet port 22, and is disposed on the side wall opposing the water sending port 25 in the ozone mixing portion 2, similarly to the water inlet port 22. The piping 42 of the gas sending portion 29 is connected to a gas suctioning portion of the ejector 37. The gas sending portion 29 need not penetrate through the ozone mixing portion 2, and may extend around the periphery of the ozone mixing portion 2.

The other components are the same as shown in FIG. 5.

An operation of the water treatment apparatus according to embodiment 2 shown in FIG. 6 will be described.

In the water treatment apparatus shown in FIG. 6, the ejector 37 corresponds to an ozone supply device and gas sending means. To-be-treated water in the ozone mixing portion 2 is suctioned by the pump 38 and is circulated in the ozone mixing portion 2 through the bypass water circulating portion 39, and gas in the treatment tank 1 is thus suctioned by the ejector 37 and is mixed with the to-be-treated water, and the gas and the to-be-treated water are supplied to the ozone mixing portion 2. The inverter (not shown) for driving the pump 38 acts as a flow rate controller for the pump 38, and controls a flow rate at which the to-be-treated water 20 in the bypass water circulating portion 39 circulates such that the flow rate has a predetermined value. The gas flow rate is adjusted to a predetermined value, by the valve 35, according to a flow rate at which the to-be-treated water circulates.

The gas supplied to the ozone mixing portion 2 moves upward from the bypass water inlet port 52 disposed at the lower portion of the ozone mixing portion 2 and is stored while reacting with the to-be-treated water 20. Gas is returned from the returned gas introduction port 10 to the treatment tank 1 through the gas returning portion 31 connected to the gas returning port 23, to circulate the gas between the treatment tank 1 and the ozone mixing portion 2. Ozone and organic substances in the to-be-treated water 20 are caused to react with each other to decompose the organic substances in the ozone mixing portion 2. The to-be-treated water 20 is suctioned by the water sending pump 28 and supplied to the treatment tank 1 through the to-be-treated water inlet portion 26. The supplied to-be-treated water 15 is treated in the treatment tank 1 as in embodiment 1.

The water treatment apparatus having the structure in FIG. 6 can control a flow rate at which gas circulates in a wider range. The water treatment apparatus having the above-described structure in FIG. 5 limits a maximum circulation flow rate to a flow rate of to-be-treated water supplied from the water inlet port 22. Meanwhile, in the present embodiment, a flow rate at which water circulates is increased by the pump 38, whereby the circulation flow rate can be increased to any rate. Furthermore, since the to-be-treated water 20 in the ozone mixing portion 2 is stirred by circulation of water by the bypass water circulating portion 39, ozone is easily dissolved into to-be-treated water, and, in addition, the to-be-treated water 20 can be caused to repeatedly react with ozone. Therefore, efficiency for decomposing organic substances can be further enhanced, and contribution to reduction of the size of the apparatus can be made.

The water storage portion 46 shown in FIG. 2 may also be disposed in the structures shown in FIG. 5 and FIG. 6.

Embodiment 3

In embodiments 1 and 2 described above, two steps of decomposition of organic substances, that is, decomposition (first step) of organic substances by ozone, and decomposition (second step) of organic substances by electric discharge, are performed, whereby ozone is efficiently utilized and the efficiency of the water treatment is enhanced. Stabilization of electric discharge is important for promoting decomposition of organic substances by electric discharge in the second step.

Meanwhile, water in nature often contains metal ions of manganese, iron, and the like. Furthermore, in factories, materials, paint, or the like often contain metals. Therefore, industrial waste water contains metal ions of manganese, iron, and the like at high concentrations in addition to persistent substances.

In a case where metal ions are contained in to-be-treated water, the metal ions are oxidized by ozone and radicals generated by electric discharge, and are insolubilized and deposited. Therefore, the water treatment apparatus using electric discharge as described in Patent Document 1 and the present disclosure needs to particularly prevent deposition of metals on an electrode at which the electric discharge is generated from causing concentration of an electric field, and needs to prevent reduction of efficiency of the water treatment and deterioration of the electrode.

Next, the principle of making electric discharge unstable in a case where metal ions are contained in to-be-treated water will be described.

Iron ions ($Fe^{2+}$) and manganese ions ($Mn^{2+}$) which are dissolved in water are quickly oxidized by ozone and OH. For example, ozone ($O_3$) causes reactions represented by the following formulae (10) to (12), thereby causing oxidization and insolubilization.

$$2Fe^{2+}+O_3+H_2O \rightarrow 2Fe^{3+}+O_2+2OH^- \quad (10)$$

$$Fe^{3+}+3H_2O \rightarrow Fe(OH)_3\downarrow+3H^+ \quad (11)$$

$$Mn^{2+}+O_3+H_2O \rightarrow MnO_2\downarrow+O_2+2H^+ \quad (12)$$

In a case where to-be-treated water that contains metal ions is directly supplied to the treatment tank 1, oxidation is caused by ozone and OH radicals generated by electric discharge in the treatment tank 1 as represented by formulae (10) to (12), and solid metal oxides or metal hydroxides are generated and insolubilized. When, for example, to-be-treated water is splashed on the upper surface of the grounded electrode 5, the insolubilized solids may be adhered to the high-voltage electrode 4. Furthermore, in to-be-treated water adhered to the high-voltage electrode 4, the reactions represented by formulae (10) to (12) are caused and metal oxides or metal hydroxides are deposited on the high-voltage electrode 4. When solids such as metal oxides or metal hydroxides are adhered to the high-voltage electrode 4, a gap between the high-voltage electrode 4 and the grounded electrode 5 is locally narrowed. Thus, the intensity of the electric field at a portion to which the solids are adhered becomes locally high, to cause spark discharge.

Once the spark discharge is generated, the spark discharge is persistently generated. As a result, the electric discharge is localized, and electric discharge is unlikely to be generated at a portion other than the portion at which the spark is generated.

The water treatment progresses as represented by formula (5) and formula (9) described in embodiment 1. Therefore, in order to efficiently cause the reaction represented by formula (5), increase of an area in which the electric discharge 6 and the to-be-treated water 15 contact with each other is important. In order to cause the reaction represented by formula (9), ozone and hydrogen peroxide according to formula (6) and formula (7) need to be dissolved into to-be-treated water. However, generation of spark discharge causes localization of electric discharge. The spark discharge increases the temperature of gas to 1000° C. or higher, to thermally decompose ozone and hydrogen peroxide. Furthermore, spark discharge causes sputtering or heating of the electrode. Therefore, the high-voltage electrode 4 and the grounded electrode 5 may be deteriorated or damaged. Accordingly, generation of spark discharge is not preferable for the water treatment.

As described above, if metal ions are contained in to-be-treated water, spark discharge is generated and electric discharge that acts in the water treatment becomes unstable. Therefore, before the water treatment is performed by electric discharge, metal ions are preferably removed.

Figure 7:
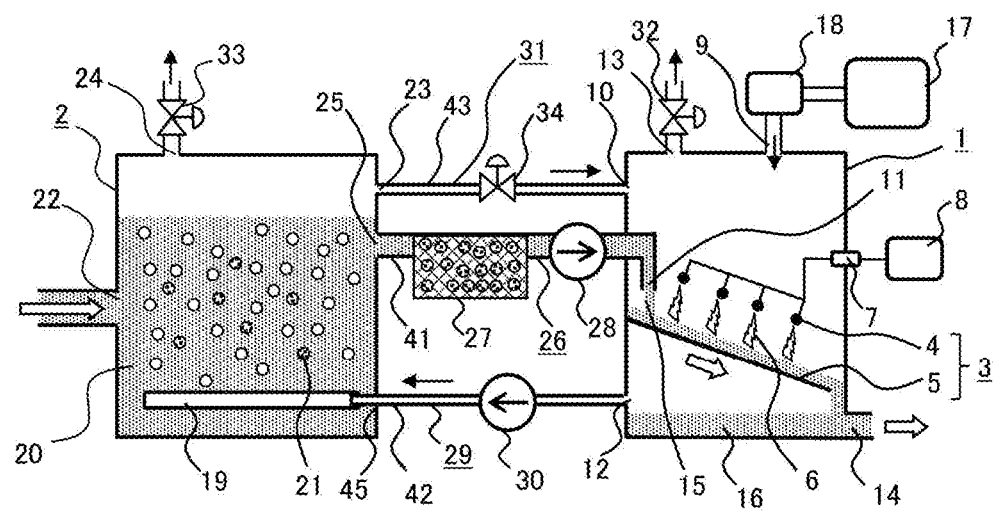
FIG. 7 is a cross-sectional view of a structure of a water treatment apparatus according to embodiment 3.

FIG. 7 is a cross-sectional view of a structure of the water treatment apparatus according to embodiment 3. In the structure in FIG. 7, the to-be-treated water inlet portion 26 in the water treatment apparatus according to embodiment 1 shown in FIG. 1 has a filtration device 27 corresponding to a solid-liquid separator. The other components are the same as shown in FIG. 1.

The to-be-treated water inlet portion 26 is a flow path for supplying the to-be-treated water 20 in the ozone mixing portion 2 to the treatment tank 1. The piping 41 has the water sending pump 28 for supplying to-be-treated water to the treatment tank 1 at a portion following the filtration device 27.

Next, an operation of the water treatment apparatus according to embodiment 3 will be described with reference to FIG. 7.

In FIG. 7, the to-be-treated water 20 supplied from the water inlet port 22 is initially stored in the ozone mixing portion 2. The to-be-treated water 20 in the ozone mixing portion 2 comes into contact with gas discharged from the gas diffusing member 19 by circulation of the gas, and is then suctioned from the water sending port 25 by the water sending pump 28. Solids 21 are removed from the suctioned to-be-treated water 20 by the filtration device 27 in the to-be-treated water inlet portion 26, and the to-be-treated water 20 is supplied from the water inlet port 11 to the treatment tank 1. The to-be-treated water 15 is supplied to the treatment tank 1 at the upstream portion of the grounded electrode 5 of the electric discharge unit 3, forms a water film on the grounded electrode 5, and flows downward.

The electric discharge 6 is generated in a space between the high-voltage electrode 4 and the grounded electrode 5 in the electric discharge unit 3 by operating the high-voltage pulsed power supply 8. The to-be-treated water 15 comes into contact with the electric discharge 6 when passing through the discharge space, thereby performing the water treatment. The treated water 16 having been subjected to the treatment by the water treatment apparatus is discharged from the water discharge port 14.

[Removal of Metal Ions]

Next, a water treatment method for efficiently removing metal ions according to embodiment 3 will be described.

Gas is supplied from the treatment tank 1 to the to-be-treated water 20 stored in the ozone mixing portion 2. The gas contains ozone, and the ozone is dissolved into the to-be-treated water 20. Since ozone is dissolved in the to-be-treated water 20, metal ions react with the ozone in the ozone mixing portion 2 into metal oxides or metal hydroxides by the reactions represented by formulae (10) to (12), and are deposited as the solids 21 and insolubilized. Furthermore, since the to-be-treated water 20 is supplied to the treatment tank 1 through the to-be-treated water inlet portion 26, the solids 21 and the to-be-treated water are separated from each other by the filtration device 27 disposed in the to-be-treated water inlet portion 26. Therefore, the to-be-treated water 15 supplied to the treatment tank 1 does not contain the solids 21, so that solids are not adhered to the high-voltage electrode 4 in the treatment tank 1. Metal ions are removed in the ozone mixing portion 2, whereby metal oxides or metal hydroxides are inhibited from being deposited in the treatment tank 1 by electric discharge.

As described above, the spark discharge is inhibited and electric discharge can be stabilized.

In embodiment 3, as in embodiments 1 and 2, ozone generated in the treatment tank 1 by the electric discharge 6 is supplied to the to-be-treated water 20 in the ozone mixing portion 2. In the present embodiment, organic substances can be decomposed and metal ions can be insolubilized in the ozone mixing portion 2 without separately using an ozone generator, and removal by the filtration device 27 can be performed.

As described above, according to embodiment 3, an ozone utilization rate can be enhanced and organic substances can be efficiently decomposed with a simple apparatus structure, and the same effect as in embodiment 1 is exhibited. That is, by bringing the to-be-treated water 20 into contact with ozone in the ozone mixing portion 2, organic substances that can be treated by ozone can also be decomposed. The organic substances decomposable by ozone can be treated and decomposed by ozone in the ozone mixing portion 2 with a higher efficiently than by treatment using OH radicals in the treatment tank 1. Therefore, the substances are decomposed by the preceding ozone mixing portion 2, whereby OH radicals can be caused to selectively react with persistent substances in the following treatment tank 1, so that the efficiency of the water treatment can be enhanced as a whole.

Metal ions contained in the to-be-treated water 20 are removed by the ozone mixing portion 2 and the filtration device 27, and deposition of metal ions in the treatment tank 1 can be inhibited. Therefore, spark discharge can be inhibited and electric discharge can be stabilized, whereby an efficient water treatment can be achieved and the electrode can be inhibited from being deteriorated or damaged.

When the containers are separately provided such that the ozone mixing portion 2 is used as a preceding container, and the treatment tank 1 is used as a following container, supply of metal ions and a deposit of metal ions to the treatment tank 1 can be inhibited and efficiency of the water treatment is enhanced with a simple structure.

In embodiment 3, an ozone concentration may be adjusted and an amount of oxygen to be supplied may be adjusted in consideration of utilizing of ozone for removing metal ions and the configuration of embodiment 1. Furthermore, an ozone concentration and an amount of oxygen to be supplied may be adjusted based on the quality of the to-be-treated water 20. For example, an amount of oxygen required for the water treatment is the total of an amount of oxygen to be dissolved into to-be-treated water, an amount of oxygen required for decomposing organic substances, and an amount of oxygen required for removing metal ions. Therefore, in a case where the concentrations of organic substances and metal ions are high, a required amount of oxygen increases. Therefore, a flow rate at which oxygen is supplied is preferably increased.

Also in embodiment 3, as in embodiment 1, a flow rate of gas circulating through the gas sending portion 29 and the gas returning portion 31 can be adjusted by the gas sending pump 30 disposed in the gas sending portion 29 and the valve 34 disposed in the gas returning portion 31.

While the water treatment apparatus is operating, a flow rate of circulating gas is preferably adjusted to be higher than a flow rate at which oxygen is supplied. For example, the flow rate of circulating gas is adjusted to be higher than or equal to 20 times the flow rate at which oxygen is supplied and less than or equal to 1000 times the flow rate at which oxygen is supplied. In a case where the flow rate of circulating gas is less than 20 times the flow rate at which oxygen is supplied, ozone is insufficiently supplied to the to-be-treated water 20 in the ozone mixing portion 2, and insolubilization and removal of metal ions are insufficient. The higher the flow rate of circulating gas is, the more frequently gas is exposed to the electric discharge 6, and ozone can be more efficiently generated and decomposition of organic substances and removal of metal ions can be efficiently performed. Meanwhile, in a case where the flow rate of circulating gas is higher than 1000 times the flow rate at which oxygen is supplied, power consumption by the gas sending pump 30 increases and heat generation from the pump increases. Thus, the temperature of the circulating gas increases and the decomposition of ozone thus increases, thereby hindering the reaction and reducing the treatment efficiency.

The flow rate of circulating gas is preferably adjusted according to a composition of to-be-treated water. For example, in a case where the concentration of metal ions in the to-be-treated water 20 is high, the circulation flow rate is increased, whereby ozone to be supplied to to-be-treated water can be increased and metal ions can be removed at a high speed.

As in embodiment 1, the concentration of ozone dissolved in the to-be-treated water 20 in the ozone mixing portion 2 is measured, and, when the concentration is low, a flow rate of circulating gas is increased, and, thus, an amount of ozone to be supplied may be controlled to increase. Such an operation allows an amount of supplied ozone to be appropriately controlled.

The internal pressure in each of the treatment tank 1 and the ozone mixing portion 2 is preferably atmospheric pressure or close thereto such that water is easily supplied or discharged by the water treatment apparatus.

Figure 8:
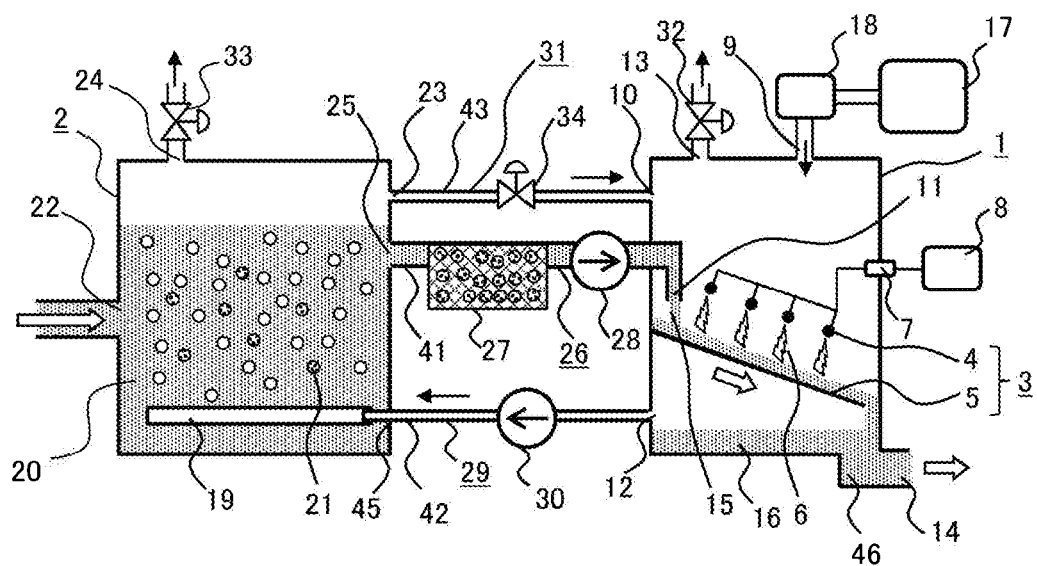
FIG. 8 is a cross-sectional view of a structure of another water treatment apparatus according to embodiment 3.

The pressure in the ozone mixing portion 2 can be controlled by the valve 34 disposed in the gas returning portion 31. For example, the pressure in the ozone mixing portion 2 may be increased by reducing a flow rate of gas flowing in the gas returning portion 31 with the use of the valve 34. In general, the higher gas pressure in a gas phase is, the higher the efficiency for dissolving ozone into water is. Therefore, ozone can be efficiently dissolved into to-be-treated water in the ozone mixing portion 2, and not only decomposition of organic substances but also removal of metal ions can be efficiently performed. In this case, since the internal pressure in the treatment tank 1 becomes a negative pressure, a water storage portion for storing the treated water 16 is disposed at the lower portion of the treatment tank 1, and the water surface of the treated water 16 is preferably located at a position higher than the water discharge port 14. FIG. 8 shows a water treatment apparatus in which the water storage portion 46 for the treated water 16 is disposed at the lower portion of the treatment tank 1. Thus, mixture of air in the treatment tank 1 can be prevented.

In embodiment 3, to-be-treated water is supplied from the ozone mixing portion 2 to the treatment tank 1 only through the to-be-treated water inlet portion 26. That is, to-be-treated water to be supplied to the treatment tank 1 passes through the filtration device 27 of the to-be-treated water inlet portion 26. Therefore, only the to-be-treated water from which the solids 21 have been removed can be supplied to the treatment tank 1. Passing of water through the filtration device 27 and supply of water to the treatment tank 1 can be performed by a single pump. Therefore, the number of pumps can be reduced and cost for power can be reduced.

The to-be-treated water inlet portion 26 is filled with to-be-treated water. Thus, gas can be prevented from being mixed into the water sending pump 28. Since no gas enters the piping, the filtration device 27 is not directly exposed to a high concentration of ozone in a gas phase. Accordingly, deterioration of the filtration device 27 due to ozone can be minimized. Furthermore, since the water sending pump 28 is disposed following the filtration device 27, to-be-treated water from which solids have been removed can be supplied to the water sending pump 28. Thus, solids can be inhibited from being mixed into the water sending pump 28, and the number of times of maintenance for the pump can be reduced.

By supply of gas to the to-be-treated water 20 in the ozone mixing portion 2, nitrogen dissolved in the to-be-treated water 20 can be expelled to a gas phase by oxygen in the supplied gas, and can be discharged through the gas discharge port 13 or the gas discharge port 24 to the outside of the water treatment apparatus. In removal of metal ions in the ozone mixing portion 2 and the water treatment in the treatment tank 1, nitrogen dissolved in to-be-treated water is oxidized to generate nitric acid and the pH of the to-be-treated water is lowered. In the water treatment technique according to the present embodiment, it is known that reaction efficiency is maximized in a neutral region. Therefore, in the operation of the water treatment apparatus of the present embodiment, pH can be inhibited from being lowered by removing the dissolved nitrogen, and high efficiency treatment can be performed.

The number of the electric discharge units 3, a distance between the high-voltage electrode 4 and the grounded electrode 5, the components of the water treatment apparatus, and the like are changeable as in embodiment 1.

Embodiment 4

Figure 9:
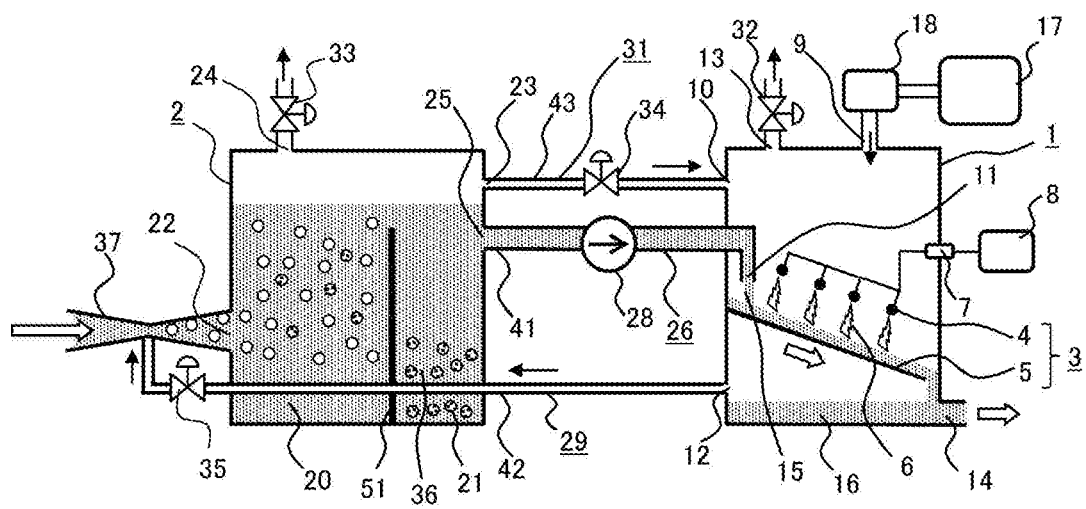
FIG. 9 is a cross-sectional view of a structure of a water treatment apparatus according to embodiment 4.

FIG. 9 is a cross-sectional view of a structure of a water treatment apparatus according to embodiment 4.

Embodiment 4 is different from embodiment 3 in that the ejector 37 for suctioning gas in the treatment tank 1, mixing the gas with the to-be-treated water 20, and supplying the gas and the to-be-treated water 20 to the ozone mixing portion 2 is disposed at the water inlet port 22 in embodiment 4. One end of the gas sending portion 29 is connected to the ejector 37, the gas sending portion 29 has the valve 35, and a solid precipitation portion 36 is disposed in the ozone mixing portion 2. Meanwhile, the gas diffusing member 19, the gas sending pump 30, and the filtration device 27 according to embodiment 3 are not provided. The piping 42 of the gas sending portion 29 is connected to a gas suctioning portion of the ejector 37. The gas sending portion 29 need not penetrate through the ozone mixing portion 2, and may extend around the periphery of the ozone mixing portion 2. The other components are the same as those in embodiments 1 and 3 described above.

The structure shown in FIG. 9 corresponds to the structure of embodiment 2 shown in FIG. 5 except that the ozone mixing portion 2 has the solid precipitation portion 36 in the structure shown in FIG. 9.

An operation of the water treatment apparatus according to embodiment 4 will be described with reference to FIG. 9.

In FIG. 9, when the to-be-treated water 20 is supplied to the ozone mixing portion 2 from the outside of the water treatment apparatus, the ejector 37 suctions gas from the treatment tank 1 through the gas sending port 12 and the gas sending portion 29, and supplies the to-be-treated water 20 and the gas into the ozone mixing portion 2 while mixing the to-be-treated water 20 and the gas. That is, the ejector 37 corresponds to a gas supply device and gas sending means for sending gas from the treatment tank 1. A gas flow rate is adjusted by the valve 35. The gas supplied to the ozone mixing portion 2 is stored in the upper portion of the ozone mixing portion 2, and the gas is then returned from the returned gas introduction port 10 to the treatment tank 1 through the gas returning portion 31 connected to the gas returning port 23, to circulate gas between the treatment tank 1 and the ozone mixing portion 2.

The solids 21 of metal oxides or metal hydroxides deposited by reaction between ozone and metal ions in the ozone mixing portion 2 are precipitated in the solid precipitation portion 36. That is, the solid precipitation portion 36 corresponds to a solid-liquid separator. The to-be-treated water 20 which has been separated from solids in the solid precipitation portion 36 is suctioned by the water sending pump 28, supplied to the treatment tank 1 through the to-be-treated water inlet portion 26, and treated in the treatment tank 1 as in embodiment 3.

In embodiment 4, power for operating the ejector 37 is not required anew. Furthermore, since gas in the treatment tank 1 is suctioned by the ejector 37, power for sending gas need not be separately provided. Therefore, cost for power can be reduced.

Furthermore, to-be-treated water and gas are mixed in the ejector 37. Therefore, efficiency for dissolving ozone is enhanced, and not only decomposition of organic substances but also insolubilization of metal ions by the dissolved ozone can be promoted. Accordingly, the ozone mixing portion 2 can be downsized, and cost for the apparatus can be reduced.

In embodiment 4, the solid precipitation portion 36 is structured to have a partition 51 at a position opposing the water inlet port 22 the ozone mixing portion 2, and blocks the flow of the to-be-treated water 20 supplied from the water inlet port 22. Thus, in the solid precipitation portion 36, according to supply of water and upward movement of bubbles, flow of the to-be-treated water 20 generated in the ozone mixing portion 2 is blocked, and a flow rate of the to-be-treated water 20 is made low, so that the solids 21 which are insolubilized in the ozone mixing portion 2 can be precipitated in the lower portion of the solid precipitation portion 36. The solid precipitation portion 36 is disposed as a solid-liquid separator without using the filtration device 27 of embodiment 3, whereby loss of pressure in the to-be-treated water inlet portion 26 can be reduced, and power for the water sending pump 28 can be reduced. The solid precipitation portion 36 is more preferable in a case where the concentration of metal ions in to-be-treated water is high, and the particle sizes of the solids are large.

According to embodiment 4, in the solid precipitation portion 36, flow of to-be-treated water in the ozone mixing portion 2 is blocked and a flow rate is made low, thereby precipitating the solids 21. Therefore, the solid precipitation portion 36 is not limited to a space partitioned by the partition 51. Although the solid precipitation portion 36 is disposed at the bottom portion of the ozone mixing portion 2, the position thereof is not limited as long as the solids 21 in to-be-treated water which is to be supplied to the treatment tank 1 are precipitated and removed. For example, the solid precipitation portion 36 may have a dent formed between the ozone mixing portion 2 and the water sending pump 28 in the piping 41 in the to-be-treated water inlet portion 26.

As described above, according to embodiment 4, the same effect as in embodiment 3 is exhibited. That is, the water treatment apparatus, exhibiting good efficiency, which can enhance an ozone utilization rate, efficiently decompose organic substances, and remove metal ions with a simple apparatus structure, can be provided.

Since the ejector 37 is used, efficiency for dissolving ozone into to-be-treated water is enhanced, and insolubilization of metal ions by ozone is also promoted. Therefore, the ozone mixing portion 2 can be downsized. Furthermore, since the ejector 37 is used, a pump for sending gas from the treatment tank 1 need not be disposed, thereby contributing to reduction of the size of the apparatus and reduction of power.

In order to separate solids that are metal oxides or metal hydroxides generated by deposition of metal ions, the solids are precipitated without using a filtration device in piping. Therefore, pressure loss is reduced, and load on a water sending pump for sending the to-be-treated water 20 to the treatment tank 1 is reduced, thereby contributing to reduction of power.

FIG. 9 shows an exemplary structure in which a filtration device is not used. However, the solid precipitation portion 36, and the filtration device 27, of embodiment 3, disposed in the to-be-treated water inlet portion 26 may be used in combination as a solid-liquid separator.

Figure 10:
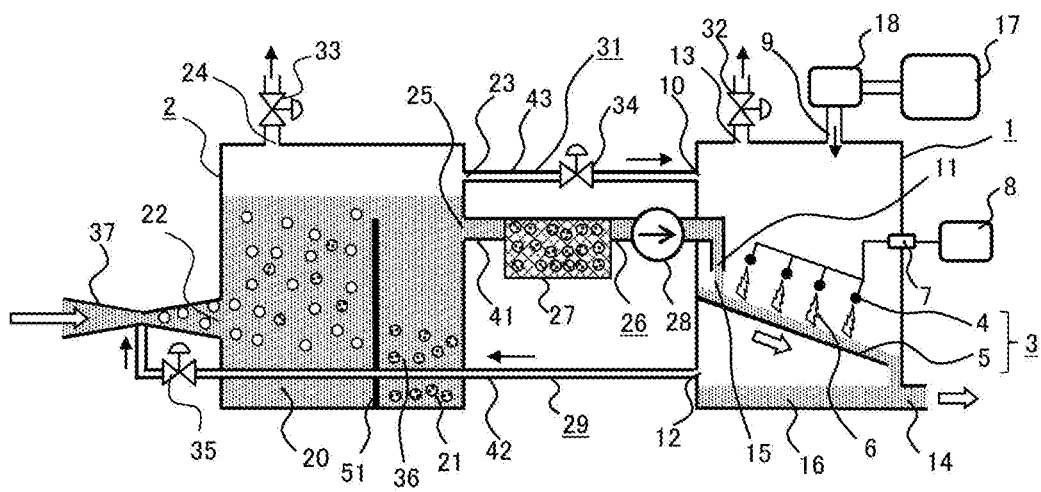
FIG. 10 is a cross-sectional view of a structure of another water treatment apparatus according to embodiment 4.

FIG. 10 is a cross-sectional view of another water treatment apparatus of embodiment 4. FIG. 10 shows an exemplary case where the solid precipitation portion 36 and the filtration device 27 are used in combination. Most of the solids in the ozone mixing portion 2 is separated by the solid precipitation portion 36, and a part of solids which is conveyed to the to-be-treated water inlet portion 26 by the flow of the to-be-treated water 20 is separated by the filtration device 27. Thus, efficiency of the water treatment apparatus is enhanced. In this case, an amount of solids captured by the filtration device 27 is less than that in the water treatment apparatus of embodiment 3, thereby reducing the number of times of maintenance for the filtration device 27. Alternatively, a small-sized filtration device that has pressure loss that is less than that of the filtration device 27 of the water treatment apparatus of embodiment 3, can be used.

By disposing the partition 51, a flow rate of to-be-treated water flowing to the to-be-treated water inlet portion 26 can be lowered, and bubbles can be inhibited from being taken into the filtration device 27 and the water sending pump 28.

Embodiment 5

Figure 11:
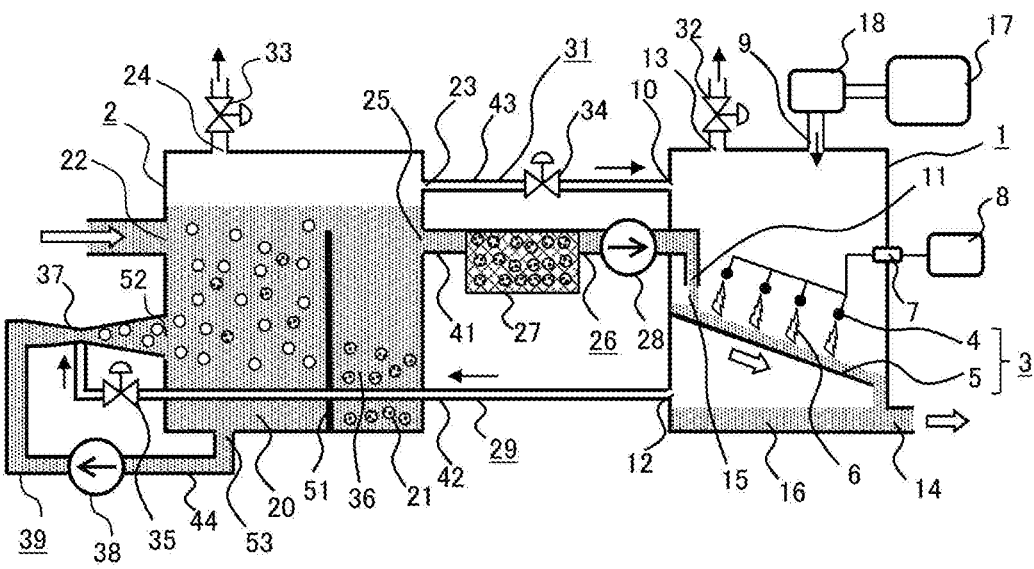
FIG. 11 is a cross-sectional view of a structure of a water treatment apparatus according to embodiment 5.

FIG. 11 is a cross-sectional view of a structure of a water treatment apparatus according to embodiment 5.

Embodiment 5 is different from embodiment 4 in that the ejector 37 is disposed not at the water inlet port 22 but at the bypass water inlet port 52 in embodiment 5. The ozone mixing portion 2 has the bypass water circulating portion 39 between the bypass water sending port 53 and the bypass water inlet port 52. The bypass water circulating portion 39 has the piping 44 connected to the bypass water sending port 53, the pump 38, and the ejector 37 connected to the piping 42 via the valve 35, and circulates the to-be-treated water 20 in the ozone mixing portion 2. An inverter (not shown) is connected to the pump 38. The bypass water inlet port 52 as a discharge port of the bypass water circulating portion 39 is disposed below the water inlet port 22, and is disposed on the side wall opposing the water sending port 25 in the ozone mixing portion 2, similarly to the water inlet port 22. The piping 42 of the gas sending portion 29 is connected to a gas suctioning portion of the ejector 37. The gas sending portion 29 need not penetrate through the ozone mixing portion 2, and may extend around the periphery of the ozone mixing portion 2. As in embodiment 3, the filtration device 27 is disposed in the to-be-treated water inlet portion 26. The bypass water sending port 53 is disposed below the bypass water inlet port 52, for example, at the bottom portion other than the bottom portion of the solid precipitation portion 36 as shown in FIG. 11.

The other components are the same as those in embodiments 3 and 4.

The structure shown in FIG. 11 corresponds to the structure of embodiment 2 shown in FIG. 6 except that the ozone mixing portion 2 includes the solid precipitation portion 36 and the filtration device 27 is disposed in the to-be-treated water inlet portion 26 in the structure shown in FIG. 11.

An operation of the water treatment apparatus according to embodiment 5 will be described with reference to FIG. 11.

In FIG. 11, the ejector 37 corresponds to an ozone supply device and gas sending means. To-be-treated water in the ozone mixing portion 2 is suctioned by the pump 38 and is circulated in the ozone mixing portion 2 through the bypass water circulating portion 39, and gas in the treatment tank 1 is thus suctioned by the ejector 37 and is mixed with to-be-treated water, and the gas and the to-be-treated water are supplied to the ozone mixing portion 2. The inverter (not shown) for driving the pump 38 acts as a flow rate controller for the pump 38, and controls a flow rate at which the to-be-treated water 20 in the bypass water circulating portion 39 circulates such that the flow rate has a predetermined value. The gas flow rate is adjusted to a predetermined value, by the valve 35, according to a flow rate at which to-be-treated water circulates.

The gas supplied to the ozone mixing portion 2 moves upward from the bypass water inlet port 52 disposed at the lower portion of the ozone mixing portion 2 and is stored while reacting with the to-be-treated water 20. Gas is returned from the returned gas introduction port 10 to the treatment tank 1 through the gas returning portion 31 connected to the gas returning port 23, to circulate gas between the treatment tank 1 and the ozone mixing portion 2. Organic substances are decomposed by reaction with ozone in the ozone mixing portion 2, and metal ions are insolubilized by reaction with ozone and deposited as the solids 21, and are precipitated in the solid precipitation portion 36. Furthermore, the to-be-treated water 20 separated from the solids in the solid precipitation portion 36 is suctioned by the water sending pump 28, and is separated from remaining solids by the filtration device 27 in the to-be-treated water inlet portion 26. That is, both the solid precipitation portion 36 and the filtration device 27 correspond to a solid-liquid separator. Thereafter, the to-be-treated water 15 is supplied to the treatment tank 1, and is treated in the treatment tank 1 as in embodiment 3.

According to embodiment 5, a flow rate at which gas circulates can be controlled in a wider range. In embodiment 4 described above, the maximum circulation flow rate is limited to a flow rate of to-be-treated water supplied from the water inlet port 22. However, in the present embodiment, a flow rate at which water circulates is increased by the pump 38, whereby the circulation flow rate can be increased to any rate. Furthermore, since the to-be-treated water 20 in the ozone mixing portion 2 is stirred by circulation of water by the bypass water circulating portion 39, ozone is easily dissolved into to-be-treated water, and not only decomposition of organic substances but also efficient removal of metal ions can be performed, thereby downsizing the ozone mixing portion 2.

Both the solid precipitation portion 36 and the filtration device 27 are disposed as the solid-liquid separator, so that solids having large particle sizes can be separated by the solid precipitation portion 36, and solids having small particle sizes can be separated by the filtration device 27. Thus, solids which may not be separated by the solid precipitation portion 36 can be separated and load on the filtration device 27 can be reduced as compared with a structure which merely includes the filtration device 27, and the number of times of maintenance for the filtration device 27 can be reduced.

As described above, according to embodiment 5, the same effects as in embodiment 3 and embodiment 4 are exhibited. That is, the water treatment apparatus, exhibiting good efficiency, which can enhance an ozone utilization rate, efficiently decompose organic substances, and also remove metal ions with a simple apparatus structure, can be provided.

Since the to-be-treated water 20 in the ozone mixing portion 2 is circulated by the bypass water circulating portion 39, the to-be-treated water 20 in the ozone mixing portion 2 is stirred, the to-be-treated water 20 is caused to repeatedly react with ozone, decomposition of organic substances is promoted, efficiency for removing metal ions can be enhanced, and the apparatus can be downsized.

Embodiment 6

Figure 12:
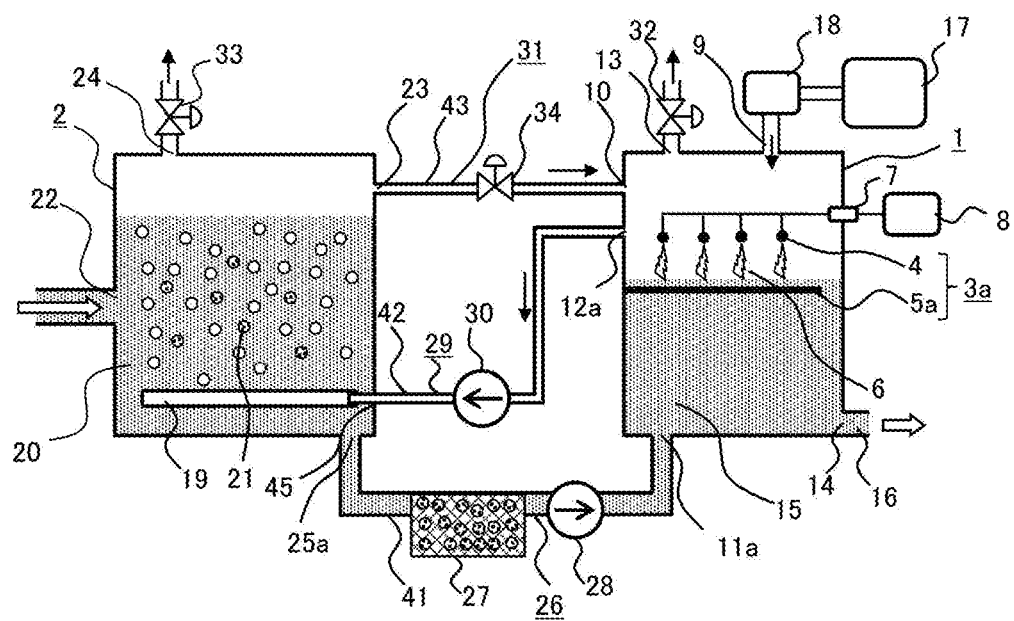
FIG. 12 is a cross-sectional view of a structure of a water treatment apparatus according to embodiment 6.

FIG. 12 is a cross-sectional view of a structure of a water treatment apparatus according to embodiment 6.

The water treatment apparatus of embodiment 6 is different from the water treatment apparatus of embodiment 3 described above in the structure of the treatment tank 1 and a position at which the to-be-treated water inlet portion 26 connects between the treatment tank 1 and the ozone mixing portion 2. The treatment tank 1 stores the to-be-treated water 15, and includes the electric discharge unit 3a that has the flat-plate-like grounded electrode 5a, having a plurality of openings, disposed under and near the water surface of the to-be-treated water 15, and a plurality (four in the drawings) of the wire-like high-voltage electrodes 4. The wire-like high-voltage electrodes 4 are disposed at regular intervals above the water surface of the to-be-treated water 15 so as to be parallel with the water surface. The grounded electrode 5a is electrically connected to the housing of the treatment tank 1 and has a ground potential. The water inlet port 11a is disposed at the bottom portion of the treatment tank 1. The water sending port 25a is disposed at the bottom portion of the ozone mixing portion 2. The to-be-treated water inlet portion 26 is disposed at the lower portion of the water treatment apparatus so as to connect between the water inlet port 11a and the water sending port 25a. As long as the water inlet port 11a is disposed at the lower portion of the treatment tank 1, the water inlet port 11a may not be disposed at the bottom portion. As long as the water sending port 25a is disposed at the lower portion of the ozone mixing portion 2, the water sending port 25a may not be disposed at the bottom portion.

The gas sending port 12a of the treatment tank 1 is disposed at the upper portion of the treatment tank 1 above the water surface of the to-be-treated water 15. The other components are the same as those in embodiment 3.

The structure shown in FIG. 12 corresponds to the structure of embodiment 1 shown in FIG. 3 except that the filtration device 27 is disposed in the to-be-treated water inlet portion 26 in the structure shown in FIG. 12.

An operation of the water treatment apparatus of embodiment 6 will be described with reference to FIG. 12.

In the water treatment apparatus shown in FIG. 12, the to-be-treated water 15 is supplied from the ozone mixing portion 2 to the treatment tank 1 until a certain amount of the to-be-treated water 15 is supplied. The certain amount represents an amount of water having a water surface level that allows the flat-plate-like grounded electrode 5a to be submerged under and near the water surface, and allows the wire-like high-voltage electrodes 4 to be not in contact with the water surface. When the certain amount of the to-be-treated water 15 has been supplied, supply of the to-be-treated water 15 to the treatment tank 1 is halted. While supply of the to-be-treated water 15 to the treatment tank 1 is halted, discharge of water from the water discharge port 14 is also halted. By operating the high-voltage pulsed power supply 8, streamer discharge 6 is generated in a space between the high-voltage electrode 4 of the electric discharge unit 3a and the water surface of the to-be-treated water 15. By the electric discharge 6 coming into direct contact with the to-be-treated water 15, the water treatment is performed. While the water treatment is performed, ozone is generated in the treatment tank 1.

After elapse of a certain time period, organic substances contained in the to-be-treated water 15 in the treatment tank 1 are decomposed, and the to-be-treated water 15 becomes the treated water 16. All the treated water 16 stored in the treatment tank 1 is discharged through the water discharge port 14. After the treated water has been discharged, the to-be-treated water 15 is supplied from the ozone mixing portion 2 through the to-be-treated water inlet portion 26 to the treatment tank 1.

The to-be-treated water 20 is stored in the ozone mixing portion 2. As in embodiment 3, gas in the treatment tank 1 is supplied through the gas sending portion 29 to the ozone mixing portion 2, and gas in the ozone mixing portion 2 is returned through the gas returning portion 31, to circulate the gas. Thus, based on the same principle as in embodiment 3, organic substances contained in the to-be-treated water 20 in the ozone mixing portion 2 are decomposed, and metal ions are caused to react with ozone and are insolubilized, and the solids 21 are deposited. Gas may be sent from the treatment tank 1 to the ozone mixing portion 2 regardless of a time period during which the water treatment is performed in the treatment tank 1. The solids 21 in the to-be-treated water 20 in the ozone mixing portion 2 are removed by the filtration device 27 in the to-be-treated water inlet portion 26, and the to-be-treated water 15 is supplied to the treatment tank 1 as the to-be-treated water from which metal ions have been removed.

As described above, according to embodiment 6, the same effect as in embodiment 3 is exhibited. That is, the water treatment apparatus, exhibiting good efficiency, which can enhance an ozone utilization rate, efficiently decompose organic substances, and can also remove metal ions with a simple apparatus structure, can be provided.

In embodiment 6, the structure of the electric discharge unit 3a is the same as that of embodiment 1 shown in FIG. 3, and, for example, a positional relationship between the high-voltage electrode 4, the grounded electrode 5a, and the to-be-treated water 15, and the shapes of the high-voltage electrode 4 and the grounded electrode 5a are changeable as in embodiment 1.

In embodiment 6, a necessary amount of to-be-treated water 15 to be supplied to the treatment tank 1 is a certain amount. The to-be-treated water 15 which has been once supplied to the treatment tank 1 is not discharged from the treatment tank 1 until the water treatment ends.

In embodiment 3, in a case where a content of persistent substances in to-be-treated water is great, treatment conditions are adjusted by, for example, increasing the number of electric discharge units and increasing power to be supplied. However, in embodiment 6, the treatment time may be adjusted and the necessary number of the electric discharge units can be minimized, thereby contributing to reduction of cost of the apparatus.

Embodiment 7

Figure 13:
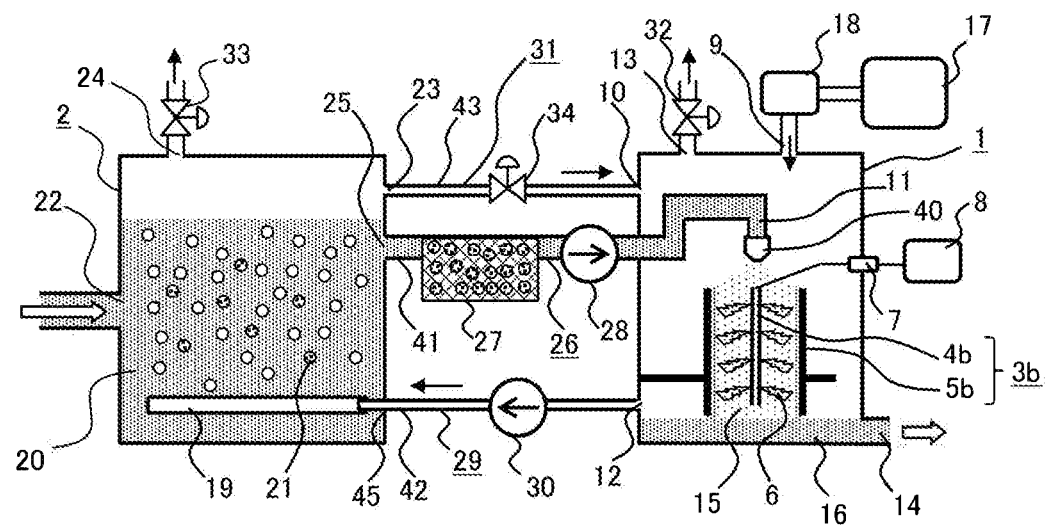
FIG. 13 is a cross-sectional view of a structure of another water treatment apparatus according to embodiment 7.

FIG. 13 is a cross-sectional view of a structure of a water treatment apparatus according to embodiment 7.

The water treatment apparatus of embodiment 7 is different from the water treatment apparatus of embodiment 3 in the structure of the electric discharge unit 3 in the treatment tank 1. The cylindrical grounded electrode 5b is disposed in the treatment tank 1 such that the central axis of the grounded electrode 5b extends in the vertical direction. The grounded electrode 5b is fixed to the side surface of the housing of the treatment tank 1 by a metal component. Thus, the grounded electrode 5b is electrically connected to the housing and has a ground potential. A plurality of the wire-like high-voltage electrodes 4b are disposed in the grounded electrode 5b along the central axis of the grounded electrode 5b. That is, a gap is formed between the high-voltage electrodes 4b and the inner surface of the grounded electrode 5b so as to maintain a constant distance. The high-voltage electrodes 4b are connected to the high-voltage pulsed power supply 8 outside the treatment tank 1 through the current feedthrough 7 by the wiring. The high-voltage electrodes 4 and the housing of the treatment tank 1 are electrically insulated from each other by the current feedthrough 7. The water inlet port 11 has a nozzle 40 for turning the to-be-treated water 15 into water droplets and dispersing the water droplets. The other components are the same as those in embodiment 3.

The structure shown in FIG. 13 corresponds to the structure of embodiment 1 shown in FIG. 4A except that the filtration device 27 is disposed in the to-be-treated water inlet portion 26 in the structure shown in FIG. 13. As shown in FIG. 4B, the high-voltage electrode 4b has a plurality of wires to stabilize electric discharge.

An operation of the water treatment apparatus according to embodiment 7 will be described with reference to FIG. 13.

In FIG. 13, the to-be-treated water 15 supplied through the to-be-treated water inlet portion 26 to the treatment tank 1 is turned into water droplets and dispersed through the nozzle 40 disposed at the water inlet port 11. The to-be-treated water 15 as water droplets drops in the vertical direction, and passes through the gap between the high-voltage electrodes 4b and the grounded electrode 5b. A part of the to-be-treated water collides with the inner surface of the grounded electrode 5b to form a water film, and flows downward. By operating the high-voltage pulsed power supply 8, the streamer discharge 6 is uniformly generated from the high-voltage electrodes 4b toward the inner surface of the grounded electrode 5b, and the water droplets of the to-be-treated water 15 and the to-be-treated water 15 that flows downward on the inner surface of the grounded electrode 5b are brought into contact with the electric discharge 6, thereby performing the water treatment. Since ozone is generated by the electric discharge 6, gas in the treatment tank 1 is supplied through the gas sending portion 29 to the ozone mixing portion 2, and gas in the ozone mixing portion 2 is returned through the gas returning portion 31 to the treatment tank 1, to circulate the gas. Ozone is supplied to the ozone mixing portion 2 by the circulation of the gas, and organic substances in the ozone mixing portion 2 are decomposed, and metal ions are insolubilized, and the solids 21 that have been insolubilized can be removed by the filtration device 27, as in embodiment 3.

According to embodiment 7, the same effect as in embodiment 3 is exhibited. That is, the water treatment apparatus, exhibiting good efficiency, which can enhance an ozone utilization rate, efficiently decompose organic substances, and also remove metal ions with a simple apparatus structure, can be provided.

As described in embodiment 1 with reference to FIG. 4A, by turning to-be-treated water into water droplets, an area in which to-be-treated water and the electric discharge contact with each other can be increased. Thus, an amount of active species to be supplied to to-be-treated water increases, so that the water treatment can be efficiently performed at a high speed.

In the ozone mixing portion 2, gas is supplied to the to-be-treated water 20, organic substances are decomposed, and metal ions are insolubilized and then removed by the filtration device 27. Thus, as in embodiment 3, deposition of metal oxides or metal hydroxides in the treatment tank 1 can be inhibited, to stabilize electric discharge. The solids 21 are removed from to-be-treated water supplied to the treatment tank 1 by the filtration device 27, whereby clogging of the nozzle 40 is unlikely to occur.

In embodiment 7, the structure of the electric discharge unit 3b is the same as that in embodiment 1 shown in FIG. 4A and FIG. 4B, and the shapes of the high-voltage electrodes 4b and the grounded electrode 5b, the positional relationship therebetween, the number of the electric discharge units, and the like are changeable as in embodiment 1.

In embodiment 7, the structure of the nozzle 40 is the same as that in embodiment 1 shown in FIG. 4A, and the direction in which the to-be-treated water 15 is dispersed is similarly changeable.

In each of embodiments 1 to 7, an example of the electric discharge unit in which the high-voltage electrode formed by four wires opposes one grounded electrode is described. However, the number of the wires is not limited to four. The number thereof may be increased or reduced in consideration of stability of the electric discharge, capacity of the pulse power supply, and the like.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 treatment tank
2 ozone mixing portion
3, 3a, 3b electric discharge unit
4, 4b high-voltage electrode
5, 5a, 5b grounded electrode
6 electric discharge
7 current feedthrough
8 high-voltage pulsed power supply
9 gas inlet port
10 returned gas introduction port
11, 11a water inlet port
12, 12a gas sending port
13 gas discharge port
14 water discharge port
15 to-be-treated water (in treatment tank)
16 treated water
17 oxygen gas source
18 mass flow controller
19 gas diffusing member
20 to-be-treated water (in ozone mixing portion)
21 solid
22 water inlet port
23 gas returning port
24 gas discharge port
25, 25a water sending port
26 to-be-treated water inlet portion
27 filtration device
28 water sending pump
29 gas sending portion
30 gas sending pump
31 gas returning portion
32, 33, 34, 35 valve
36 solid precipitation portion
37 ejector
38 water circulating pump
39 bypass water circulating portion
40 nozzle
41, 42, 43, 44 piping
45 gas introduction port
46 water storage portion
51 partition
52 bypass water inlet port
53 bypass water sending port

The invention claimed is:

1. A water treatment apparatus comprising:
an ozone mixing portion formed as a sealed container in which ozone-containing gas is supplied to to-be-treated water;
a treatment tank formed as a sealed container separate from the ozone mixing portion, the treatment tank including an electric discharge unit having a grounded electrode and a high-voltage electrode opposing the grounded electrode, the treatment tank generating electric discharge by the electric discharge unit, generating ozone by the electric discharge, and bringing the to-be-treated water into contact with the electric discharge;
a gas sending portion for connecting between the ozone mixing portion and the treatment tank and supplying ozone-containing gas in the treatment tank, to the to-be-treated water in the ozone mixing portion;
a to-be-treated water inlet portion for connecting between the ozone mixing portion and the treatment tank and supplying the to-be-treated water from the ozone mixing portion to the treatment tank; and
a gas returning portion for connecting between the ozone mixing portion and the treatment tank and sending gas in the ozone mixing portion to the treatment tank.

2. The water treatment apparatus according to claim 1, wherein the gas returning portion includes a flow rate controller for controlling a flow rate of gas to be sent from the ozone mixing portion to the treatment tank.

3. The water treatment apparatus according to claim 1, wherein the gas sending portion includes a flow rate controller for controlling a flow rate of gas to be sent from the treatment tank to the ozone mixing portion.

4. The water treatment apparatus according to claim 1, comprising a solid-liquid separator for separating solids deposited, by supply of ozone, in the to-be-treated water in the ozone mixing portion, wherein
the to-be-treated water inlet portion supplies, to the treatment tank, the to-be-treated water from which the solids have been separated.

5. The water treatment apparatus according to claim 4, wherein the solid-liquid separator is disposed in the to-be-treated water inlet portion.

6. The water treatment apparatus according to claim 4, wherein the solid-liquid separator is disposed in the ozone mixing portion.

7. The water treatment apparatus according to claim 1, wherein the ozone mixing portion includes a gas discharge port through which gas in the ozone mixing portion is discharged to outside of the ozone mixing portion.

8. The water treatment apparatus according to claim 1, wherein the electric discharge unit has a plurality of the high-voltage electrodes disposed so as to oppose the one grounded electrode.

9. A water treatment method comprising:
a first water treatment step of supplying gas containing ozone, to to-be-treated water stored in a first sealed container;
a second water treatment step of bringing the to-be-treated water having been subjected to the first water treatment step, gas after the first water treatment step, and supplied oxygen into contact with an electric discharge, in a second sealed container; and
a step of sending gas, containing ozone, generated by the electric discharge in the second sealed container, to the first sealed container, and adjusting a flow rate of circulating gas that circulates in the first and the second sealed containers, wherein
the ozone generated by the electric discharge in the second water treatment step is used in the first water treatment step.

10. The water treatment method according to claim 9, wherein solids deposited from metal ions in the to-be-treated water are separated from the to-be-treated water in the first water treatment step, and the second water treatment step is thereafter performed.

11. The water treatment apparatus according to claim 3, wherein
   the treatment tank includes a gas inlet port through which oxygen gas is supplied, and
   the gas returning portion and the gas sending portion adjust a flow rate of circulating gas that circulates in the ozone mixing portion and the treatment tank by using the respective flow rate controllers such that the flow rate of the circulating gas is higher than a flow rate of the supplied oxygen.

\* \* \* \* \*